United States Patent
Fullerton et al.

(10) Patent No.: US 7,132,975 B2
(45) Date of Patent: Nov. 7, 2006

(54) APPARATUS AND METHOD FOR DETECTING MOVING OBJECTS

(75) Inventors: Larry W. Fullerton, Brownsboro, AL (US); James Richards, Fayetteville, TN (US)

(73) Assignee: Time Domain Corporation, Huntsville, AL (US)

( * ) Notice: Subject to any disclaimer, the term of this patent is extended or adjusted under 35 U.S.C. 154(b) by 143 days.

(21) Appl. No.: 10/856,037

(22) Filed: May 28, 2004

(65) Prior Publication Data

US 2005/0264438 A1    Dec. 1, 2005

(51) Int. Cl.
  *G01S 13/62* (2006.01)
(52) U.S. Cl. .......................... 342/28; 342/90; 342/106; 342/107; 342/108; 342/114; 342/115; 342/157; 342/158; 342/159; 342/162; 342/195
(58) Field of Classification Search .................. 342/28, 342/89–101, 104–115, 157–162, 189, 195
See application file for complete search history.

(56) References Cited

U.S. PATENT DOCUMENTS

| | | | | |
|---|---|---|---|---|
| 3,772,516 | A | * 11/1973 | Roberts et al. .......... | 250/203.1 |
| 5,537,119 | A | * 7/1996 | Poore, Jr. .................... | 342/96 |
| 5,748,140 | A | 5/1998 | Schober | |
| 5,808,579 | A | 9/1998 | Rademacher | |
| 5,959,574 | A | * 9/1999 | Poore, Jr. .................... | 342/96 |
| 5,960,097 | A | * 9/1999 | Pfeiffer et al. .............. | 382/103 |
| 6,177,903 | B1 | 1/2001 | Fullerton et al. | |
| 6,218,979 | B1 | 4/2001 | Barnes et al. | |
| 6,262,680 | B1 | * 7/2001 | Muto .......................... | 342/74 |
| 6,404,380 | B1 | * 6/2002 | Poore, Jr. .................... | 342/96 |
| 6,445,832 | B1 | * 9/2002 | Lee et al. ................... | 382/266 |
| 6,518,914 | B1 | 2/2003 | Peterson et al. | |
| 6,710,743 | B1 | * 3/2004 | Benner et al. .............. | 342/453 |
| 2002/0008657 | A1 | * 1/2002 | Poore, Jr. .................... | 342/96 |
| 2005/0264438 | A1 | * 12/2005 | Fullerton et al. ............. | 342/28 |

OTHER PUBLICATIONS

"A constrained extended Kalman filter for target tracking", Nordsjo-A-E. Proceedings of the 2004 IEEE Radar Conference, Philadelphia, PA, USA, Apr. 26-29, 2004. p. 123-127.*

* cited by examiner

*Primary Examiner*—John B. Sotomayor
(74) *Attorney, Agent, or Firm*—James Richards

(57) ABSTRACT

An ultra wideband radar system for detecting moving objects comprising an antenna, which may be scanned in at least one dimension, and a signal processor wherein the signal processor includes a scan combiner that combines scan information in accordance with a candidate trajectory for the moving object. Scans may be combined by integration or filtering. A fast calculation method is described wherein the scans are combined into subsets and subsets are shifted in accordance with the candidate trajectory before further combination. A method is described wherein a region is scanned with an ultra wideband radar, the scan information is combined in accordance with an expected trajectory to enhance the object signal to noise. Further features are described wherein the scan information is combined according to a family of trajectories. A trajectory yielding a potential object detection initiates a further scan combination step wherein the family of trajectories is further resolved.

62 Claims, 18 Drawing Sheets

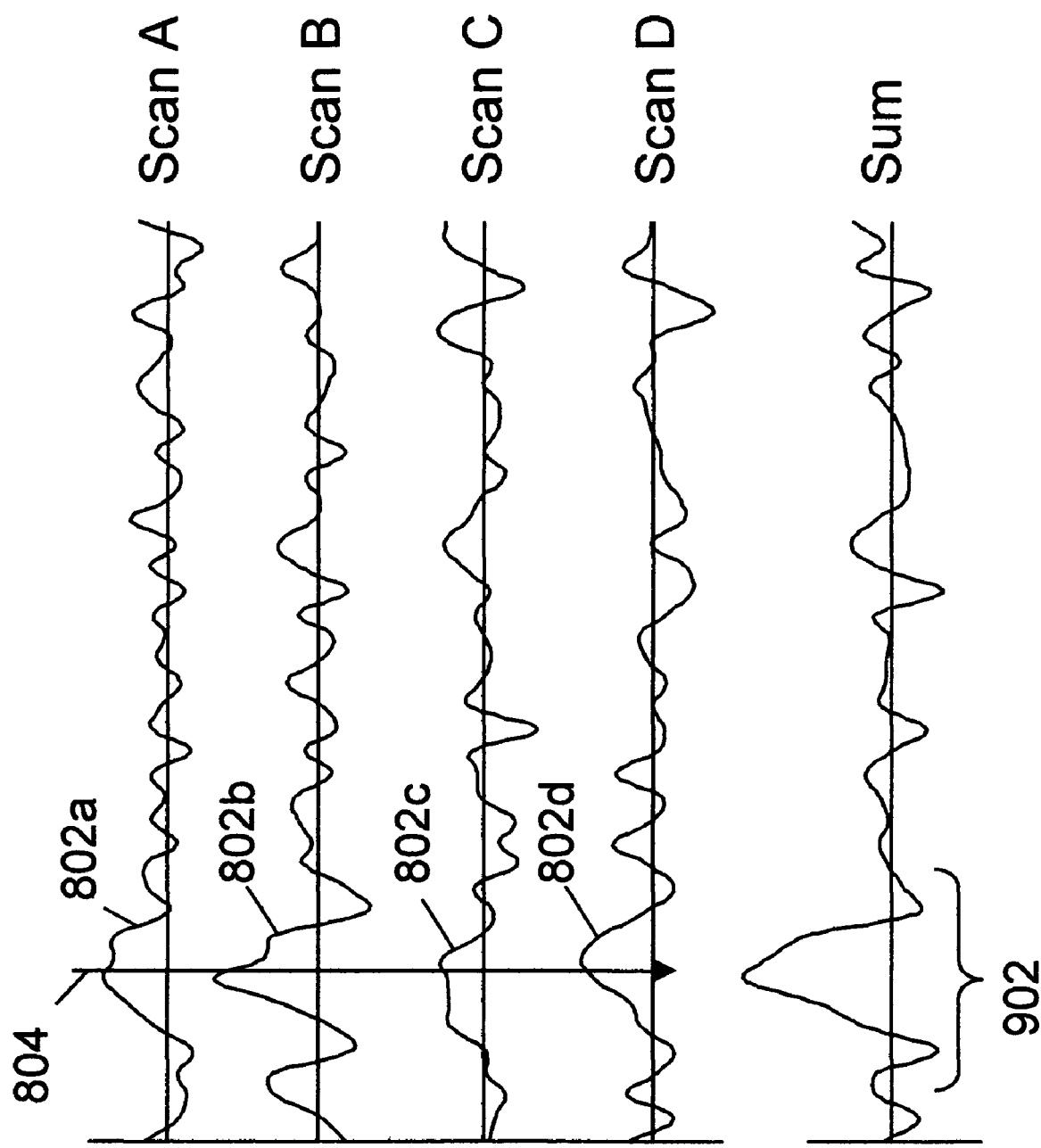

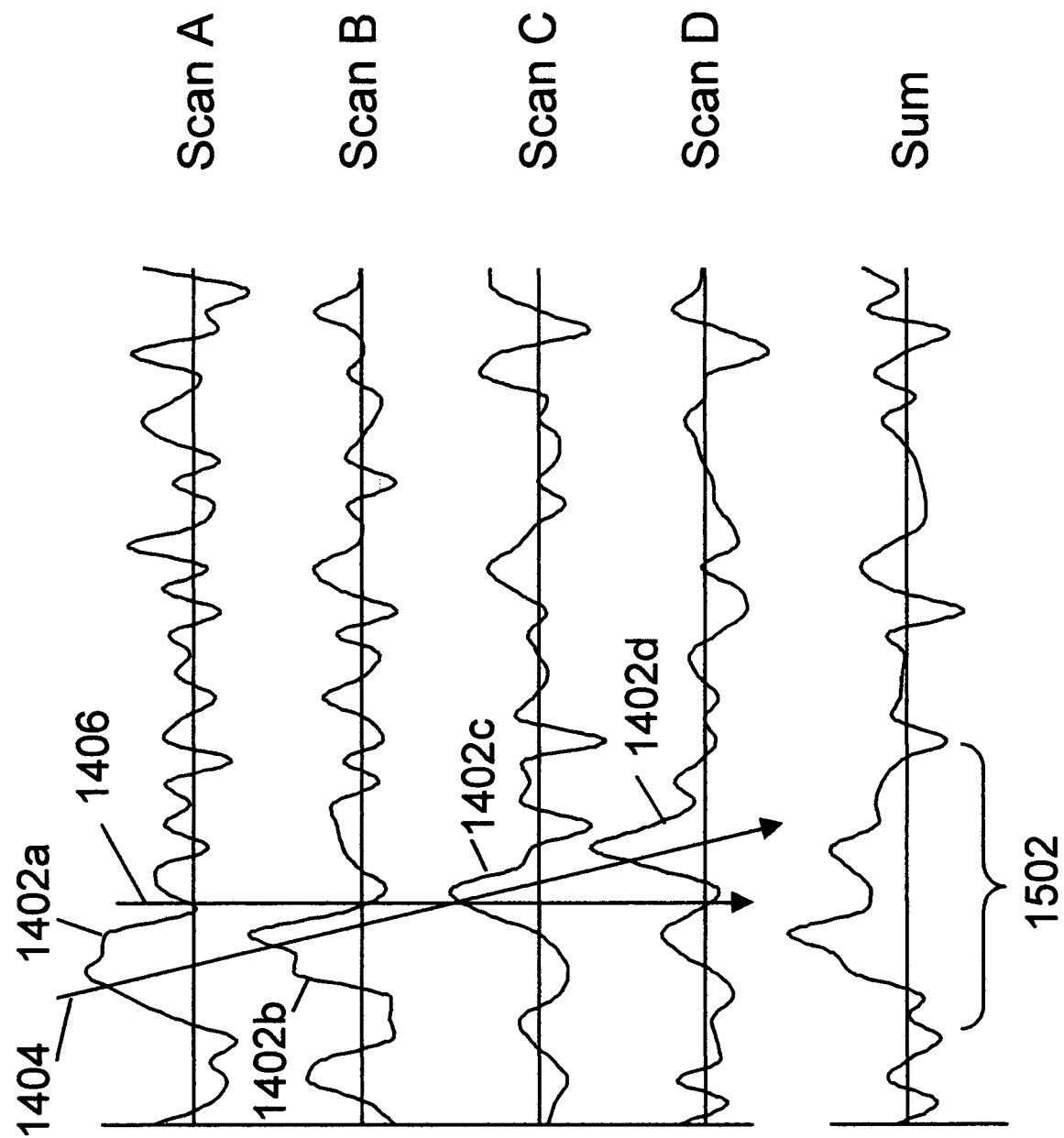

APPARATUS AND METHOD FOR DETECTING MOVING OBJECTS

BACKGROUND

1. Field of the Invention

The present invention pertains generally to the field of radar signal processing and more particularly to the processing of radar signals for detection of moving objects.

2. Background of the Invention

Radar systems, including ultra wideband (UWB) radar systems are often employed to detect moving objects. The moving objects of interest vary from system to system and may include objects as diverse as an aircraft, a weather system, a person, a golf ball, a bird, a car, or other objects, as may be of interest. Ultra wideband is particularly advantageous for short range detection because of the fine range resolution available due to the ultra-wide bandwidth. Various approaches to UWB radar have been described in the literature that utilize signal architectures including pulse trains, coded pulse trains, and wide band code modulated RF. All of these systems can achieve a very narrow range resolution bin by virtue of their extremely wide bandwidth.

When UWB radar is used for detecting stationary objects, the sensitivity of the radar can theoretically be increased without limit simply by integrating the return signal indefinitely. In practice, however, there are limitations in the stability of the electronics and in the time allowed to achieve a result that prevent unlimited integration.

For moving objects, the motion of the object presents a further limit on the possible integration time for object detection. Motion affects both the instantaneous phase of the response as well as the amplitude. If the object moves more than ¼ wavelength of the center frequency of the UWB signal during the integration time, the structure of the object signature may be significantly affected. If the object moves more than the range equivalent of the resolution bandwidth or more than the length of the object during the integration time, the object may move entirely out of the response bin, resulting in integration of noise alone, without an object response signal, reducing rather than increasing system sensitivity.

Conventional techniques for detecting moving objects include subtracting previous scan information from the current scan to look for differences resulting from the position shift of the object due to object motion over time. This technique can improve object detection in stationary clutter, but does not improve the object signal to noise ratio without clutter and is of limited utility against moving clutter. Thus, there is a need for improved techniques for detection of moving objects using ultra wideband radar that can increase the signal to noise ratio of the object response and that are effective against moving clutter.

BRIEF DESCRIPTION OF THE INVENTION

Briefly, the present invention comprises an ultra wideband radar system and method for detecting moving objects. The radar system comprises an antenna which may be scannable in at least one dimension, and a signal processor wherein the signal processor includes a scan combiner that combines scan information in accordance with an candidate trajectory for the moving object. Scans may be combined by integration or filtering. A fast calculation method is described wherein the scans are combined into subsets and subsets are shifted in accordance with the candidate trajectory before further combination. A method is described wherein a region is scanned with an ultrawideband radar. The scan information is combined in accordance with an expected trajectory to enhance the object signal to noise. Further features are described wherein the scan information is combined according to a family of trajectories. A trajectory yielding a potential object detection initiates a further combination step wherein the family of candidate trajectories is further resolved.

These and further benefits and features of the present invention are herein described in detail with reference to exemplary embodiments in accordance with the invention.

BRIEF DESCRIPTION OF THE DRAWINGS

The invention is described with reference to the following drawings. In the drawings, like numbers represent identical or similar components. The first digits of a reference number identify the drawing number wherein the reference first appears.

FIG. 10 illustrates the sequence of scan patterns of FIG. 8 with the further inclusion of an additive noise signal;

FIG. 11 illustrates a sum of the scans of FIG. 10 where the sum is in accordance with a matching trajectory;

FIG. 14 illustrates a sequence of scans where the alignment is slightly in error from a matching trajectory;

FIG. 15 illustrates a sum of the scans of FIG. 12 where the alignment is slightly in error from a matching trajectory;

DETAILED DESCRIPTION OF THE INVENTION

Figure 1:
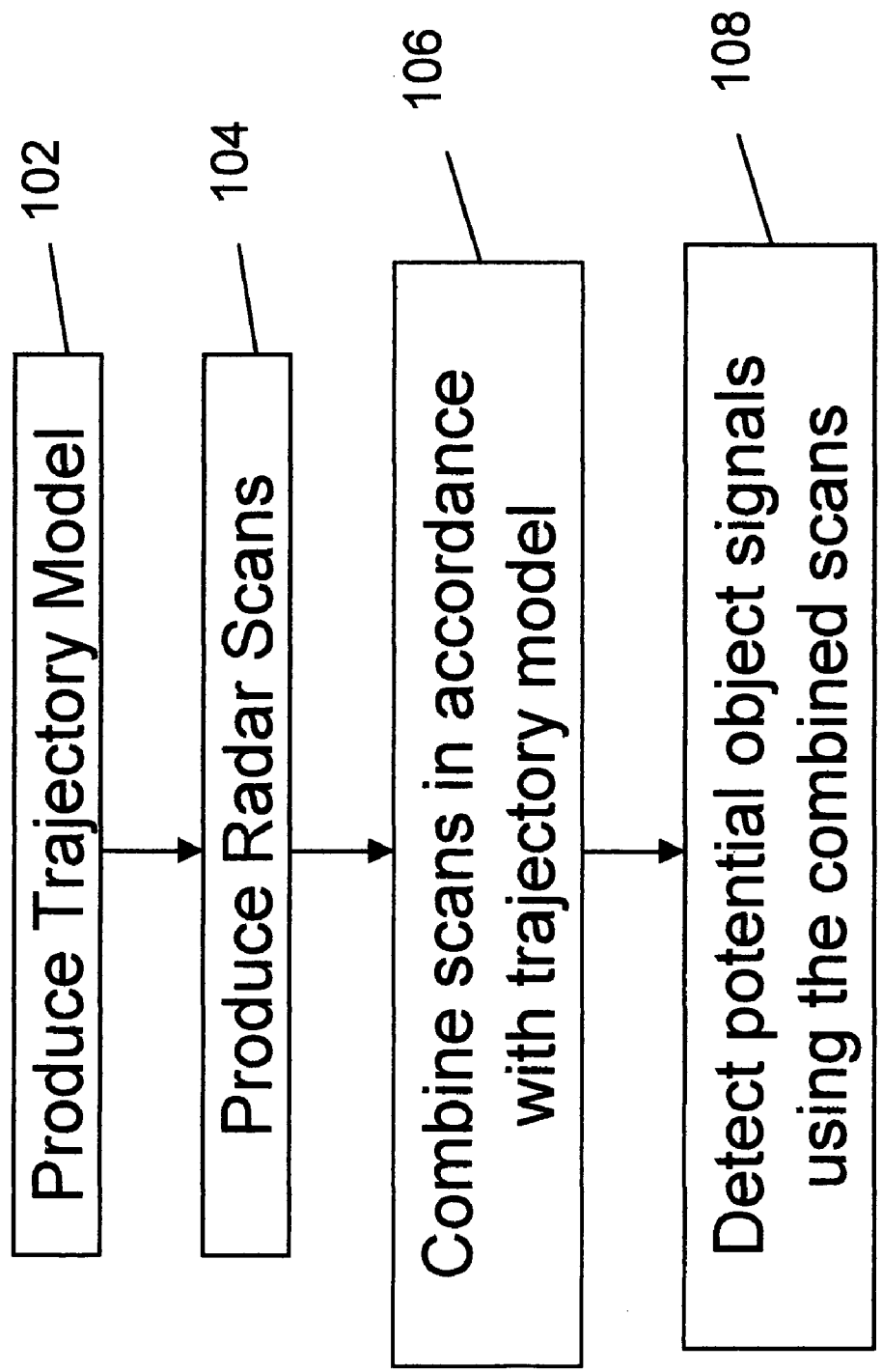
FIG. 1 illustrates the steps of a method in accordance with the present invention.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

UWB Background

Impulse radio has been described in a series of patents, including U.S. Pat. No. 4,641,317 (issued Feb. 3, 1987), U.S. Pat. No. 4,743,906 (issued May 10, 1988), U.S. Pat. No. 4,813,057 (issued Mar. 14, 1989), U.S. Pat. No. 4,979,186 (issued Dec. 18, 1990), and U.S. Pat. No. 5,363,108 (issued Nov. 8, 1994) to Larry W. Fullerton. A second generation of impulse radio patents includes U.S. Pat. No. 5,677,927 (issued Oct. 14, 1997), U.S. Pat. No. 5,687,169 (issued Nov. 11, 1997), U.S. Pat. No. 5,764,696 (issued Jun. 9, 1998), 5,832,035 (issued Nov. 3, 1998), and U.S. Pat. No. 5,969,663 (issued Oct. 19, 1999) to Fullerton et al, and U.S. Pat. No. 5,812,081 (issued Sep. 22, 1998), and U.S. Pat. No. 5,952,956 (issued Sep. 14, 1999) to Fullerton, which are incorporated herein by reference.

Uses of impulse radio systems are described in U.S. Pat. No. 6,177,903 (issued Jan. 23, 2001) titled, "System and Method for Intrusion Detection using a Time Domain Radar Array" and U.S. Pat. No. 6,218,979 (issued Apr. 17, 2001) titled "Wide Area Time Domain Radar Array", which are incorporated herein by reference.

Detection of Moving Objects with UWB Radar

The present invention is a system and method for detecting moving objects using ultra wideband radar. The present invention enhances the signal to noise ratio of the object response signal by summing consecutive scans along an estimated, or candidate, object path, or trajectory. When the candidate path is sufficiently close to the actual object path, the object response is coherently summed; whereas noise and clutter is incoherently summed, thereby enhancing the signal to noise ratio and signal to clutter ratio of the object response and increasing the detection range of the radar system. In a typical system, many object paths are possible and an object may be at any point on any path. Thus, it is necessary to examine multiple paths to determine if an object can be detected on any one path. Where the possible paths are defined by a range of possible paths, a family of discrete paths may be examined that sufficiently cover the range of possible paths to assure detection of an object along any path in the range. In one embodiment, if a potential detection occurs along one of the paths in the family of paths, a further search is made of a family of paths of finer resolution in the neighborhood of the detection. The further search attempts to refine the trajectory information and to improve the certainty of detection.

The present invention is utilized to best advantage when information is known about a possible object path. When more information is known about possible object paths, fewer path family members will be necessary to cover the range. Such information may include, but is not limited to: object velocity, distance limits, direction limits, maximum detection range (distance), range of object sizes, range of radar cross sections, object source position or direction, or object destination. For example, a baseball being thrown by a pitcher has a limited source in the neighborhood of the pitcher's mound and a definite direction toward the destination of home plate. There is also a narrow range of baseball sizes and a fairly limited range of velocities. A radar system designed to measure the speed of each pitch may utilize all of the available information to reduce the calculations necessary to detect the ball and measure its velocity.

Thus, in accordance with the present invention, radar return signals are integrated using successive scans in accordance with the expected motion of a potential object. The resulting integration potentially yields a received object signal with improved signal to noise and improved signal to clutter ratios. The improved signal quality allows improved range and velocity measurements, and increases the certainty of object detection for greater ranges. Further details of the invention enable efficient calculation of the sums utilized in the combination of radar scan information.

Further details and advantages will become apparent as the invention is now described with respect to the preferred embodiments.

FIG. 1 illustrates the steps of a method in accordance with the present invention. Referring to FIG. 1, in step 102, a trajectory, or path, model is produced that models a path expected for an object potentially in the radar field. In step 104, a UWB radar is provided and configured to scan in at least one dimension. The radar may include a directional antenna and may utilize antenna directivity for one or more scan dimensions. The radar is scanned over a region comprising one or more dimensions, such as, for example, range, azimuth, or elevation, or possibly X and Y Cartesian coordinates. As the radar is scanned, the scanned signal information is recorded in memory. In step 106, the scanned signal information is combined in accordance with the expected trajectory model. Typically a range of expected trajectories comprising a set of expected trajectories is each utilized to combine the scanned signal information. In step 108 each scan combination from step 106 is used to detect potential objects using a detector, typically a threshold detector. Other processing may be performed to enhance signal to noise or to adapt or optimize performance for a particular application. Such processes include background subtracting, clutter suppression, absolute value, signature matching, constant false alarm threshold setting and others.

Figure 2:
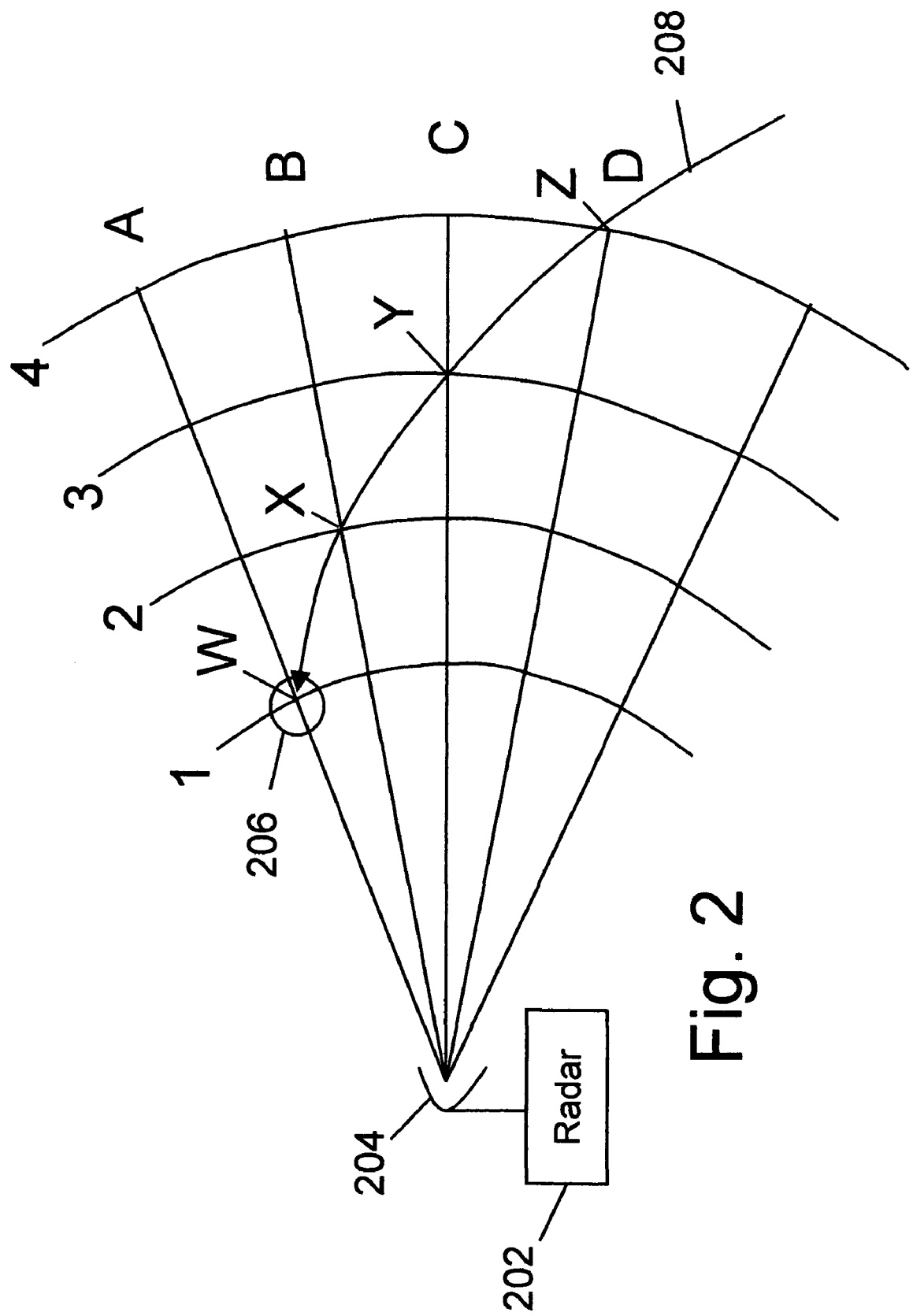
FIG. 2 depicts a radar scanning pattern showing an object and object path.

FIG. 2 depicts a radar scanning pattern showing an object 206 and object path 208. Referring to FIG. 2, a radar 202 is coupled to a directional antenna 204 which may be scanned through a range of angles (radials A, B, C, and D). The scanning may be mechanical scanning or electrical scanning. Radials A, B, C, and D are shown representing different angles for the peak lobe of directivity for the directional antenna 204. The radar may be scanned in time, which translates to distance, or range, as shown by the range markers 1, 2, 3, and 4. As shown in FIG. 2, the radar 202 is scanned in two dimensions, angle and range. Depending on the application, the radar 202 may be scanned in one dimension, two dimensions, or three dimensions, or more, as needed (Note that object signature properties may be used as additional scan dimensions). As shown, the coordinates are angle and range. Other coordinate systems may be used such as Cartesian x and y. Mapping between coordinate systems is well known in the art.

The result of scanning is typically the filling of an array with scan data. The array may be filled in any order. For example, a range scan may be performed for one angle and then the angle changed to produce the next range scan and then changed again until a range scan is produced for each incremental angle. Alternatively, the angles may be scanned for one range and then the range changed and all angles scanned again. Alternatively the scan may be a mixed pattern of range and angle, possibly driven by a code or pseudorandom process.

As shown in FIG. 2, an object 206 traces a path 208 or trajectory 208 through the scanned region. The exemplary path 208 shown crosses range 1, radial A, (1,A), at time W, moving subsequently through (2,B) at time X, (3,C) at time Y, and (4,D) at time Z. Thus, the radar is scanned through range and angle at multiple times.

Although four scans are shown in FIG. 2, any number of scans may be used to cover an area, from one to thousands or more, depending on the application.

FIGS. 3 through 11 illustrate the combination of scans, showing first the combination of scans not in accordance with a matching trajectory and then showing the combination of scans that are in accordance with a matching trajectory. Scans are shown both with and without noise to better view the relative positions of the object response signals.

Figures 3, 4, 5:
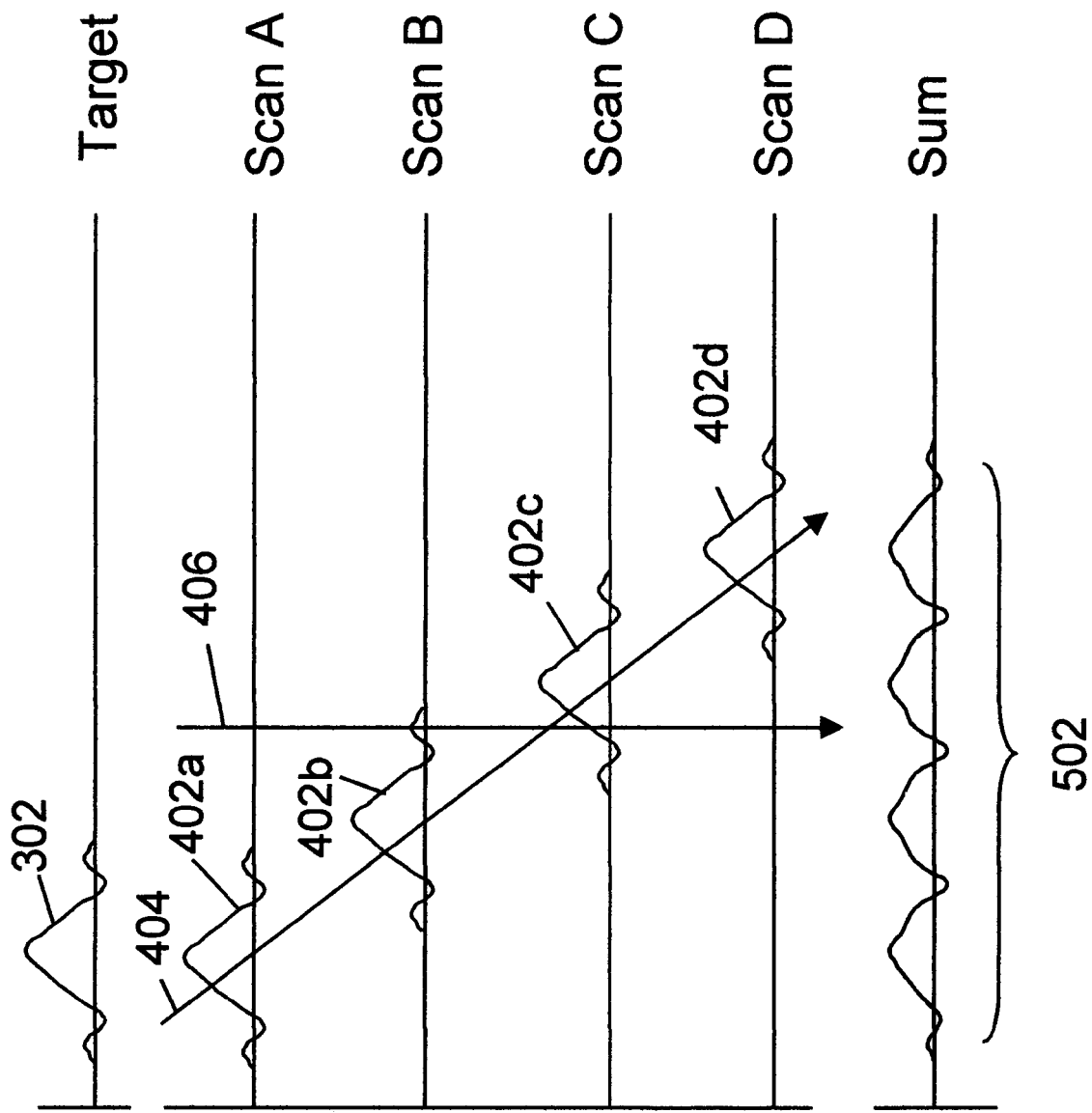
FIG. 3 illustrates an exemplary scan pattern showing an object response signal.
FIG. 4 illustrates a sequence of scan patterns showing object motion.
FIG. 5 illustrates a sum of the scan patterns of FIG. 4 where the sum is not in accordance with a matching trajectory.

FIG. 3 illustrates an exemplary radar scan showing an exemplary object response signal 302 without additive noise. FIG. 3 is a signal trace for an exemplary object 206 showing signal voltage vs. range or time delay between the transmitted pulse and received pulse.

FIG. 4 shows exemplary radar scans A–D where the alignment is not in accordance with the trajectory of the object. FIG. 4 Scan A is a signal trace along radial A at time W, showing the object signal 402a without additive noise. FIG. 4 Scan B is a signal trace along radial B at time X, when the object lies along radial B. FIG. 4 Scan C and FIG. 4 Scan D likewise show the object signals 402c and 402d along radial C at time Y and along radial D at time Z respectively. Line 404 shows the effect of a path 208 or trajectory 208 in the movement of the object response signal. Line 406 shows the direction of summation to be used for the summation shown in FIG. 5.

FIG. 5 shows the sum of the signals of FIGS. 4. Scans A–D. The amplitude shown in FIG. 5 is divided by 2 to normalize the FIG. 5 plot for constant noise RMS amplitude relative to the noise in FIG. 4 plots for visual comparison of the relative signal to noise performance. The amplitude is divided by two (2=sqrt(4)) since the RMS value of uncorrelated random noise increases as the square root of the number of summed signals (for equal RMS values) and there are four plots summed in FIG. 5. Although no noise is shown in FIGS. 4 and 5, the divide by two is performed for consistency and comparison with FIGS. 6 and 7, which do show noise.

Figures 6, 7:
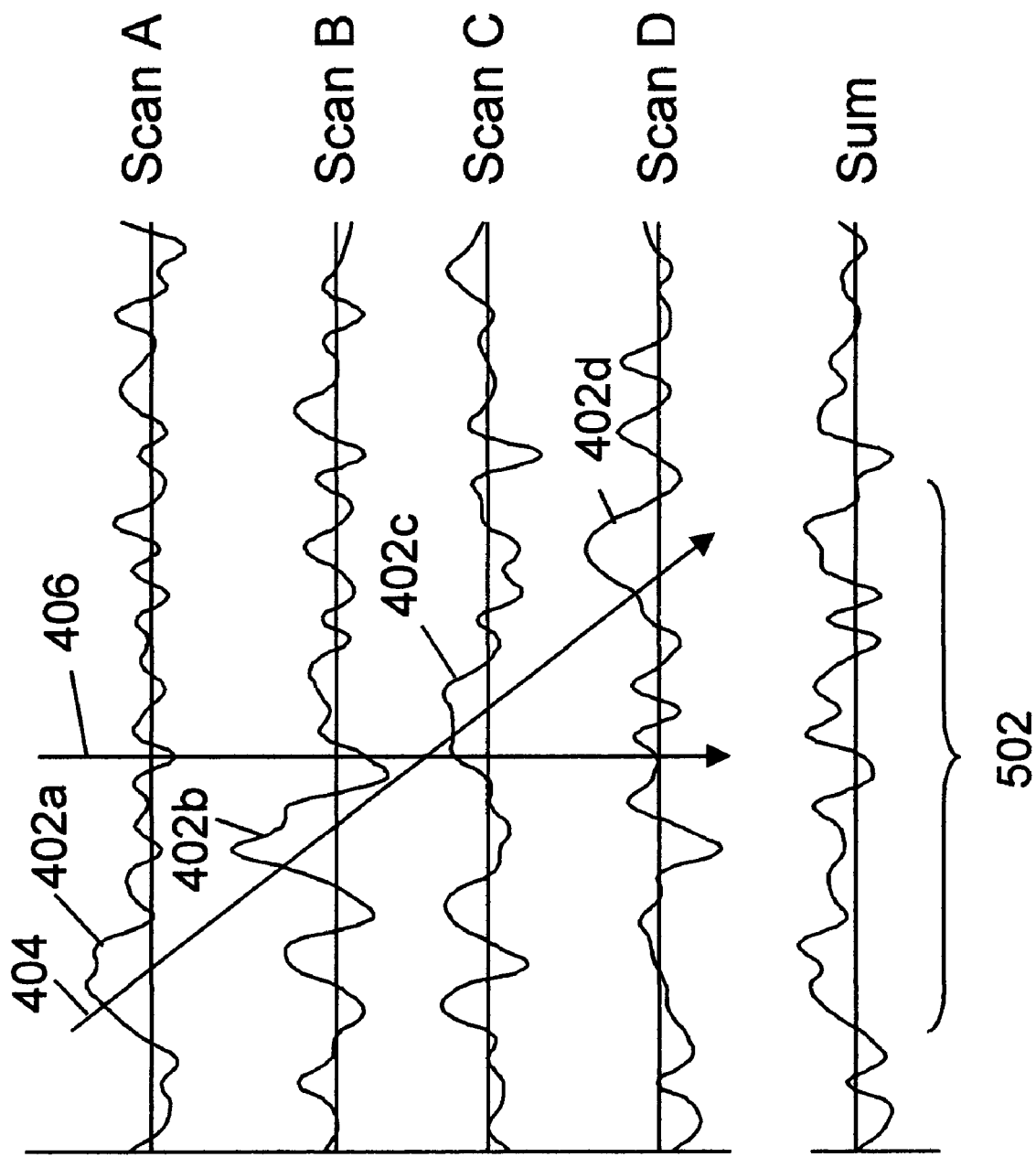
FIG. 6 illustrates the sequence of scan patterns of FIG. 4 with the further inclusion of an additive noise signal.
FIG. 7 illustrates a sum of the scan patterns of FIG. 6 where the sum is not in accordance with a matching trajectory.

FIG. 6 shows exemplary radar scans A–D including additive noise where the alignment is not in accordance with the trajectory of the object. Referring to FIG. 6, Scan A is a signal trace along radial A at time W, showing the object signal 402A with additive noise. Note that the object signal is barely distinguishable above the noise. Scan B is a signal trace along radial B at time X, when the object lies along radial B. Scan C and Scan D likewise show the object signals 402c and 402d with additive noise along radial C at time Y and along radial D at time Z respectively. Note that the object signal 402c in the Scan C example is suppressed by coincident opposing noise illustrating that the object signal may be easily missed by a detector depending on the noise present. FIG. 7 shows the sum of the signals of Scans A–D. The amplitude shown in the scans of FIG. 6 and FIG. 7 is divided by 2 to normalize the plot for constant noise RMS amplitude among the FIGS. 3–7 graphs for visual comparison of relative signal to noise performance. Note that the summed object signals 502 are further suppressed relative to the noise because the object signals 402A–402D do not add coherently and are summed with additional noise.

Figures 8, 9:
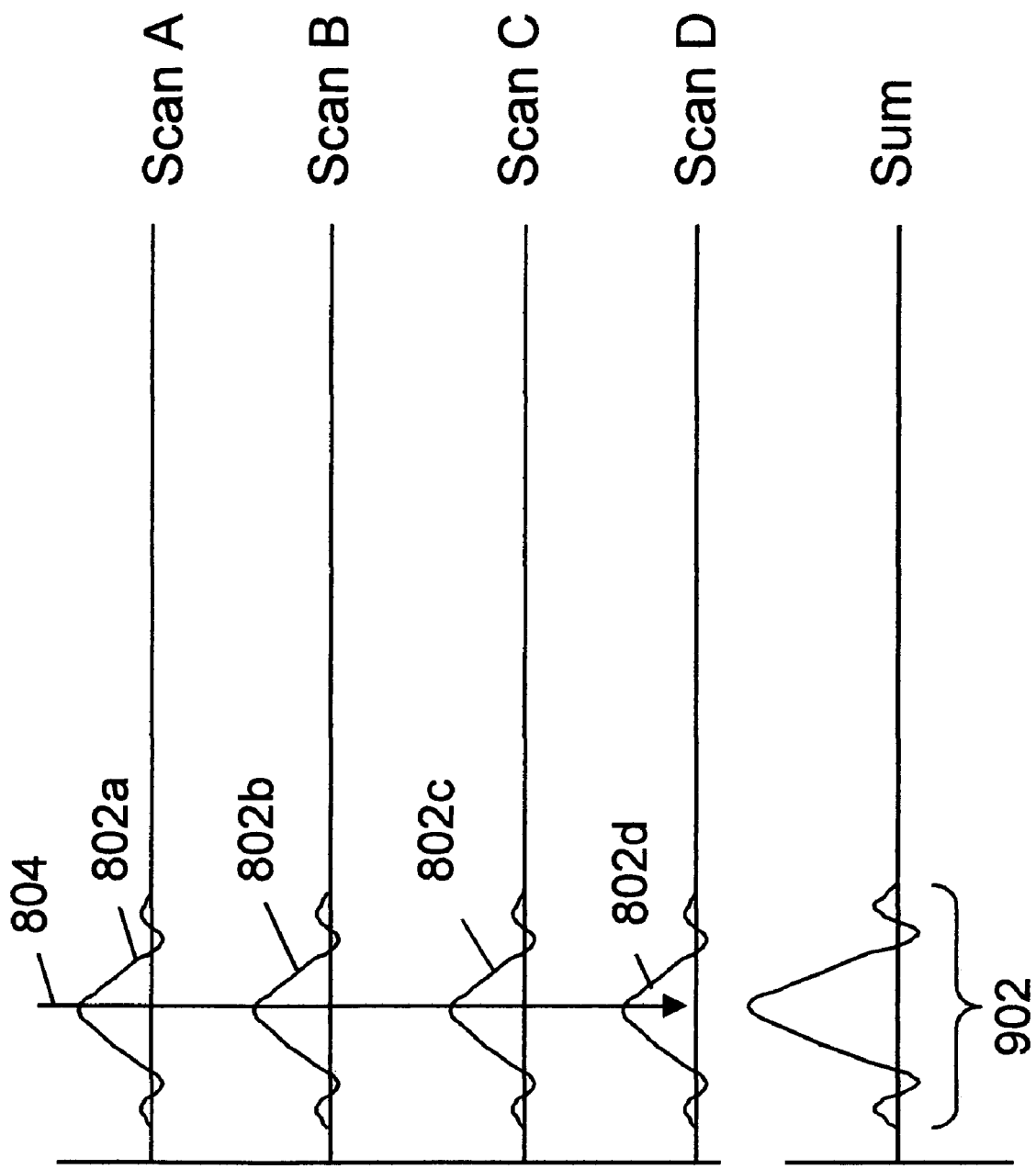
FIG. 8 illustrates the sequence of scan patterns of FIG. 4 with the respective object response signals aligned in accordance with a matching trajectory.
FIG. 9 illustrates a sum of the scans of FIG. 8 where the sum is in accordance with a matching trajectory.

FIG. 8 illustrates the alignment of the radar scan patterns of FIG. 4 in accordance with a trajectory model that matches the trajectory of the object. The data from FIG. 4 scans have been shifted into alignment in FIG. 8. FIG. 9 shows the sum of the data from FIG. 8, Scans A–D. Again, the sum shown in FIG. 9 is divided by two in amplitude to normalize for constant RMS noise level when comparing FIGS. 8 and 9. Line 804 represents both the trajectory alignment and the summation direction.

FIG. 10 illustrates the combination of the radar scans A–D of FIG. 4 in accordance with a trajectory model that matches the trajectory of the object. Scans A–D of FIG. 10 show the object response 802 and additive noise with the data shifted in time in accordance with the trajectory model. FIG. 11 shows the sum of the data from FIG. 10 Scans A–D. Again, the sum shown in FIG. 11 is divided by two in amplitude to normalize for constant RMS noise level when comparing FIGS. 10 and 11. In comparing the sum shown in FIG. 11 with the sum shown in FIG. 7, note that the object response signal 902 in FIG. 11 clearly exceeds the noise level farther than the sum 502 in FIG. 7 because of the coherent addition of the object response signals 802 cans A–802D to produce the object response sum signal 902.

The exemplary scans of FIG. 6, FIG. 7, FIG. 10, and FIG. 11 may be described in terms of array data. Accordingly, scan A shown in FIG. 6 is the array A(1,1 . . . 40), i.e. the first 40 element row of array A. Likewise Scan B in FIG. 6 shows the array A(2, 1 . . . 40), the second 40 element row of Array A, and so on. FIG. 7 shows the column sum M(1 . . . 40), where each M(i)=A(1,i)+A(2,i)+A(3,i)+A(4,i), for i=1 . . . 40. Similarly, Scan A of FIG. 10 is the array A(1, 1 . . . 40), but Scan B of FIG. 10 is A(2, 6 . . . 46), FIG. 10C is A(3, 12 . . . 52), and Scan D of FIG. 10 is A(4,18 . . . 58). The scans of FIG. 10 are shifted by an amount according to the trajectory model. The trajectory model for FIG. 10 is an array T[0,6,12,18]. The object moves an amount equivalent to six samples for each successive scan. Thus, the sum for FIG. 10 is $$M(i) = A(1, i + T(1)) + A(2, i + T(2)) + A(3, i + T(3)) + A(4, i + T(4))$$
$$= A(1, i + 0) + A(2, i + 6) + A(3, i + 12) + A(4, i + 18)$$

for $i = 1 \ldots 40$.

For simplicity the above array examples assume that data exists beyond the limits of the square array being examined, i.e. A(n,i) where i>40 or i<1. In many systems the data exists, but if the data are not available due to radar timing limits or otherwise, a suitable substitution may be devised. In particular, zero may usually be substituted for data where no data are available. More typically, if data are not available to complete the calculation, the window of interest is reduced to exclude doubtful results.

Whereas, the scans of FIG. 10 are described in accordance with array data and shifted in integral positions, as may be appropriate for a particular situation, the data may be shifted in partial position amounts by interpolating between positions and using interpolated values in place of the shifted data. Numerous interpolation alogorithms may be found in the literature, including linear, polynomial, cubic spline, and other methods. For example, if the data at position 3 were 85 and at position 4 were 95, using linear interpolation, the data for an interpolated position 3.5 would be 90.

Figure 12:
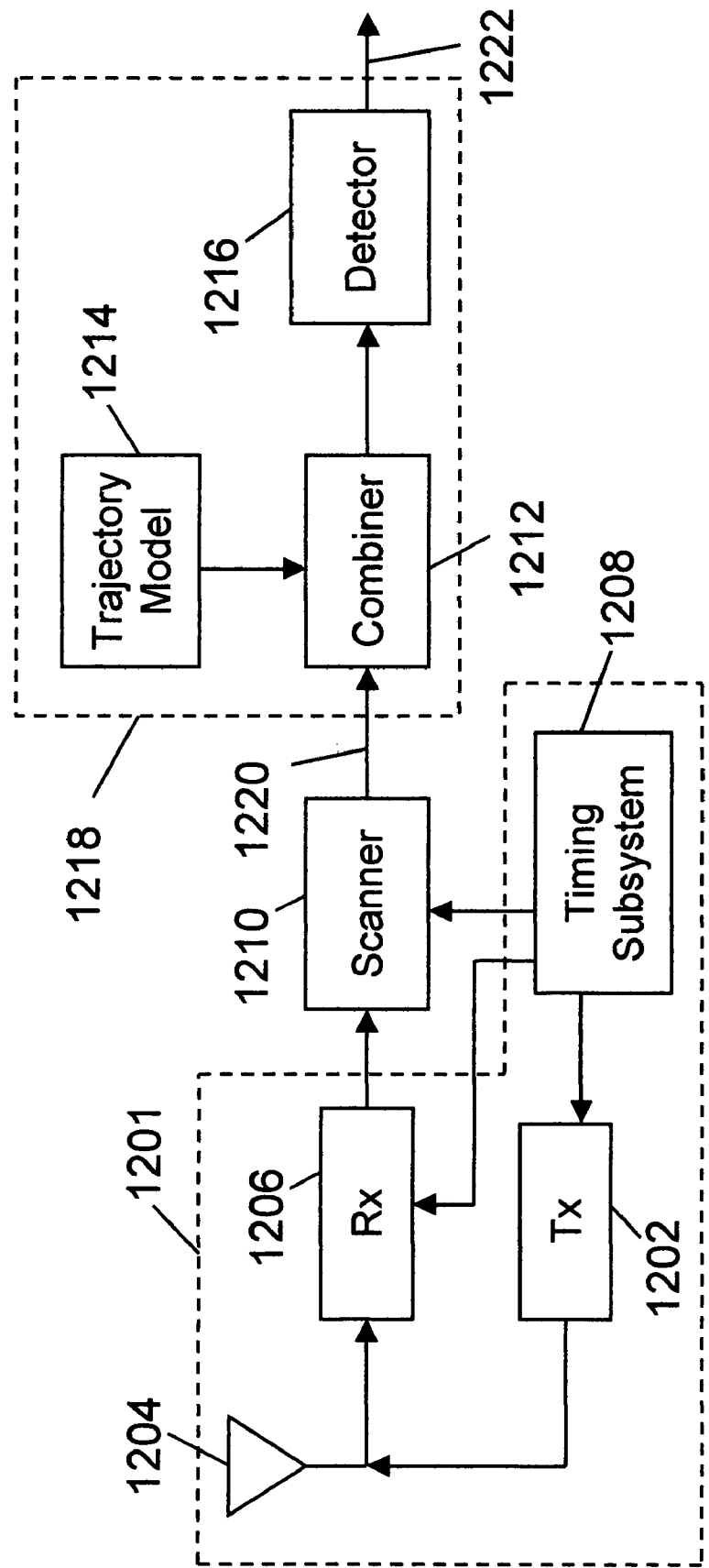
FIG. 12 is an exemplary functional block diagram of a radar system in accordance with the present invention.

FIG. 12 is an exemplary functional block diagram of a radar system in accordance with the present invention. Referring to FIG. 12, a radar subsystem 1201 comprising a radar transmitter 1202, radar receiver 1206, and timing subsystem 1208 is controlled to scan and provides response data to a scanning subsystem 1210. A radar transmitter 1202 transmits a signal which is reflected by an object and received by a radar receiver 1206. A timing subsystem 1208 coordinates transmit and receive operations. Received signals are coordinated and accumulated using a scanning subsystem 1210. The radar subsystem 1201 is controlled to scan in one or more dimensions and the successive return signal samples along each scan are recorded in scan memory. For example, a radar subsystem 1201 may be controlled to scan in distance (or range) by timing successive receiver samples at incrementally longer delay times from the transmitted pulse time. Alternatively, a radar subsystem 1201 may be controlled to scan in angle by incrementally changing the antenna 1204 pattern direction for each transmitted and received pulse operation. The radar subsystem 1201 may be scanned in distance and angle by scanning first in one dimension, for example distance, and then changing angle and scanning in distance again. Alternatively, the scanning of one or more dimensions may be performed using non-sequential, random, pseudo-random, coded, or other like patterns in place of the incremental changes. The scan data set 1220 output of the scanner 1210 is then processed by the object detection subsystem 1218 (also termed scan processing system in this disclosure) to produce a detection output 1222. Specifically, the scan data are combined in combiner 1212 in accordance with a trajectory model provided by a trajectory model source 1214 to produce a combination signal. The combination signal is delivered to a detector 1216 which provides a detection output 1222 indicative of potential object signal returns.

In one embodiment, the object detection subsystem 1218 combines the output of the scanner 1210 in accordance with each of a family of trajectory models in sequence. In other words, the same scan signals are combined with different time shifts as defined by each trajectory model of a family of trajectory models to produce a plurality of combination signals that can be individually delivered to detector 1216 to detect potential object signal returns.

In another embodiment, two or more object detection subsystems 1218 receive and process in parallel the output of scanner 1210.

Figure 13:
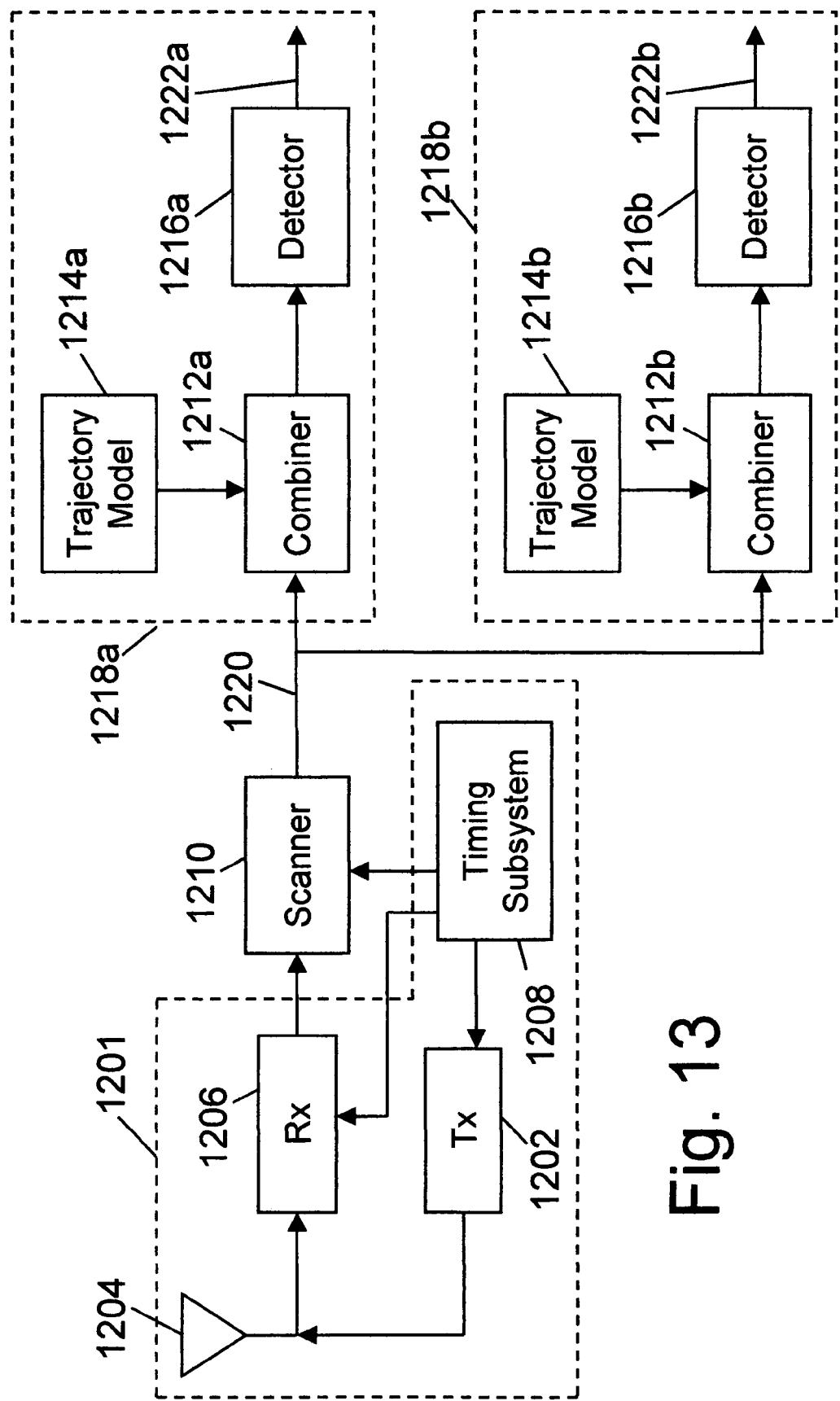
FIG. 13 is an exemplary functional block diagram of a radar system in accordance with the present invention showing multiple object detection systems.

In FIG. 13, two object detection subsystems 1218a and 1218b receive the scan data set 1220 output of scanner 1210. Referring to FIG. 13, the scan data set 1220 is fed to two combiners 1212a and 1212b. Each combiner also receives a trajectory model from the respective trajectory model source 1214a and 1214b. The combination outputs are fed to respective detectors 1216a and 1216b producing respective detection signal outputs 1222a and 1222b. Under one arrangement, each of the two or more detection subsystems combines the output of scanner 1210 in accordance with a different trajectory model of the same family of trajectory models. Thus, the sequential processing of FIG. 12 is performed in parallel. Alternatively, each of the two or more detection subsystems might combine the output of scanner 1210 in accordance with different trajectory model from multiple families of trajectory models. In still another embodiment, each object detection subsystem 1218a, 1218b combines the output of scanner 1210 in accordance with a different trajectory model of a different family of trajectory models. Here, each object detection subsystem 1218a, 1218b combines the output of scanner 1210 in accordance with each trajectory model of a different family of trajectory models in sequence.

FIG. 14 illustrates the effect of a slight difference between the actual trajectory and trajectory model. FIG. 14 illustrates the object returns cans A–D (scans A–D) with additive noise shifted by an amount which is close but not equal to the amount needed to match the object trajectory. Line 1404 represents the effect of a candidate trajectory mismatch showing a slight movement in object response signals 1402a–1402d from scan A to scan D. Line 1406 represents the direction of summation for the scans. Line 1406 also marks the center of the summed object response 1502.

FIG. 15 is the sum of the signals shown in FIG. 14. Note that for the summation point indicated by 1406, only two of the four object signals contribute to the summation and that the resulting sum signal 1502 is lower in magnitude than the summation 902 shown in FIG. 11. Thus, it is desirable to assure that the trajectory model is very close to the actual object trajectory. In one embodiment, a sufficient number of trajectory models in a family of trajectory models is provided to assure the desired detectability. The number required may be determined by calculations as shown in FIGS. 14 and 15. The effect of trajectory model error can be evaluated and the set of trajectory models can be selected such that the maximum error is not exceeded. This is accomplished by increasing the number of trajectory models over a given range to reduce the spacing between adjacent trajectory models to reduce the maximum difference between a potential trajectory and its closest matching candidate trajectory.

In one embodiment of the invention, a single scan is used to initiate the summation process, i.e. an object detection in a single scan is used to initiate a summation of several scans in the neighborhood of the detection. Once a detection is found, a summation process is initiated using a family of trajectory models with trajectory parameters in the neighborhood of the detection. If an enhancement is detected for one member of the family of the trajectory models, an object may be indicated; if no enhancement is found, the detection may be rejected as a false alarm. Thus, the detection threshold may be set lower than it would be set for object detection without the summation process and still achieve a similar false alarm rate from the system. Alternatively, for the same detection threshold setting, the system may have a lower false alarm rate.

Figure 16:
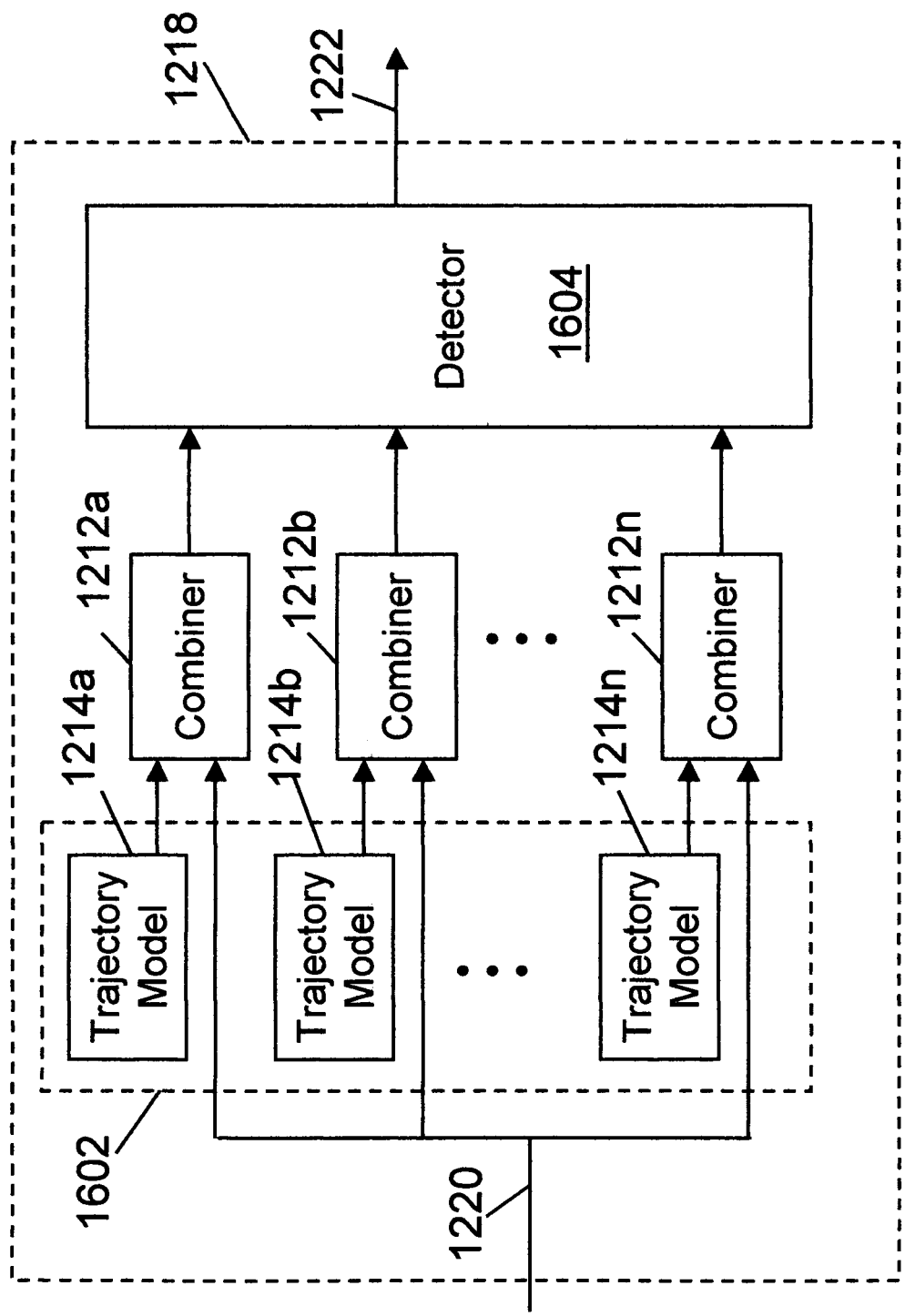
FIG. 16 illustrates a scan processing system employing parallel trajectory model evaluation.

FIG. 16 illustrates a scan processing system 1218 employing parallel trajectory model evaluation. The scan processing system 1218 of FIG. 16 is particularly adapted for evaluating scans in accordance with a family of trajectory models 1602. Referring to FIG. 16, scan data 1220 is fed to multiple combiners 1212a–1212n in parallel. Each combiner 1212a–1212n receives a different trajectory model from a group, or family of trajectory models 1602. Each combiner 1212a–1212n combines the scan data 1220 in accordance with the respective trajectory model 1214a–1214n fed to the combiner 1212a–1212n. The multiple combiner outputs are fed to a multiple input detector 1604. The multiple input detector 1604 compares the outputs of each of the combiners 1212a–1212n to determine which outputs suggest likely object detections and provides the results to the detection output 1222. In one embodiment, the multiple input detector 1604 selects the single combiner 1212a–1212n output with the greatest likelihood of an object signal, compares that signal with a likelihood criterion and provides a digital decision of whether an object is detected or not. The detection criterion may be a threshold in a threshold comparator. The detection process may also include pattern matching, such as correlation matching applied to the combiner output data. The detection output 1222 may include the identification of which trajectory model yielded the greatest likelihood, and may include information relating to the probability of detection or probability of false alarm. Alternatively the detection output 1222 may include information on multiple combiner outputs that may meet the detection criterion.

Figure 17:
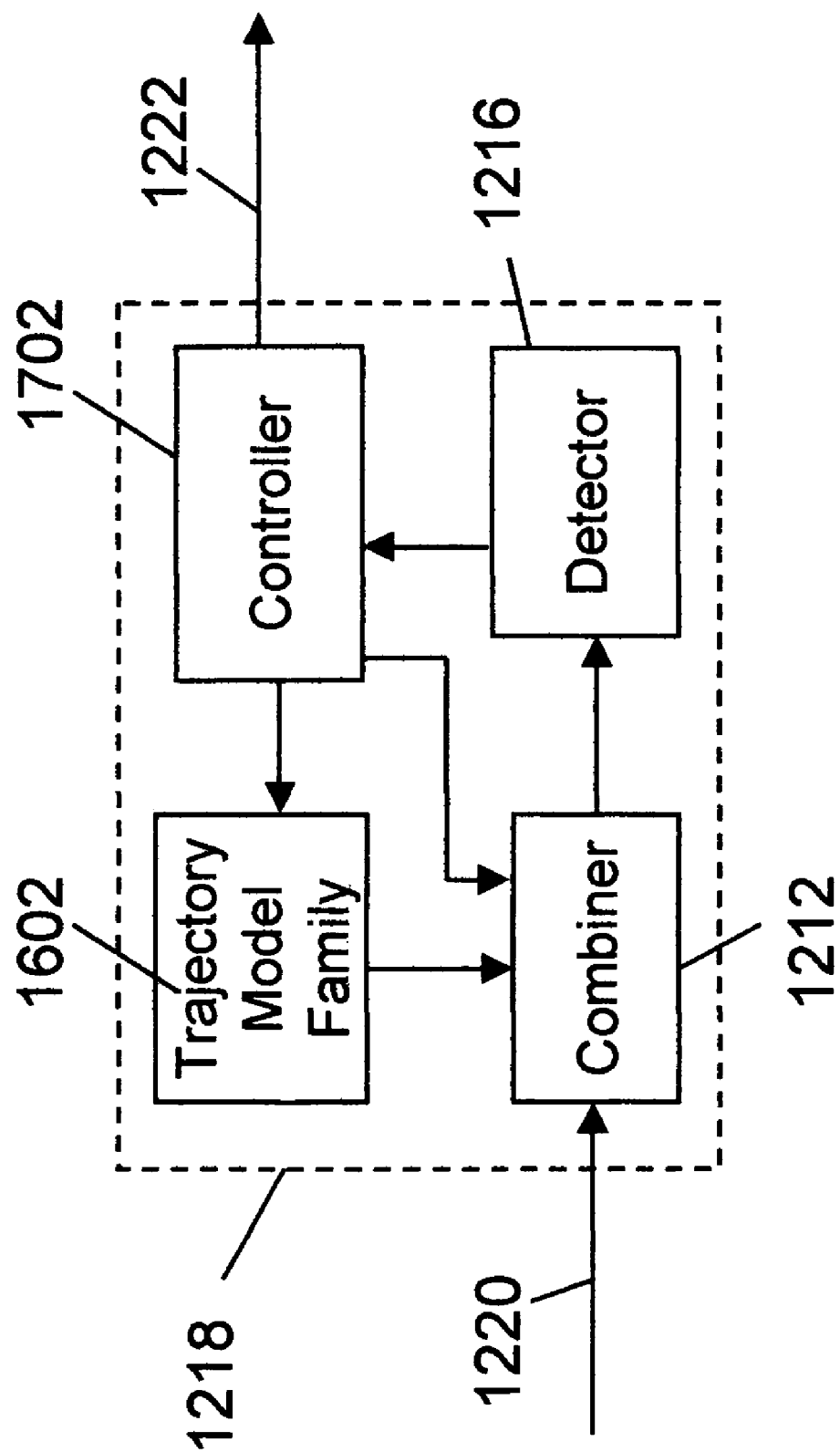
FIG. 17 illustrates a scan processing system employing iterative evaluation of multiple trajectory models.

FIG. 17 illustrates a scan processing system 1218 employing iterative evaluation of multiple trajectory models. The scan processing system 1218 of FIG. 17 may be used to sequence through a family of predetermined trajectory models 1602 or may be used to adaptively select or generate trajectory models based on combiner and detector results. FIG. 17 is an exemplary functional block diagram of a scan processing system 1218 employing an iterative combiner 1212 in accordance with the present invention. The combiner 1212 performs successive combination operations on the scan information using successive trajectory models. Referring to FIG. 17, the 1210 data is coupled to an iterative combiner 1212 along with a trajectory model from an iterative trajectory model source 1602 in accordance with a controller 1702. The iterative combiner 1212 output is coupled to a detector 1216. The output of the detector 1216 is coupled to the controller 1702 where the detector 1216 output may be used in the controller 1702 algorithm and/or may be delivered to the output.

In one embodiment, where the scan processing system 1218 cycles through the members of a family of trajectory models 1602, the controller 1702 successively selects trajectory models from a family of trajectory models 1602, initiates the combiner 1212, and evaluates the detection result. Depending on the needs of the application, the controller 1702 may deliver the first detection result, or may search through the entire family for the most probable detection, if any, or may deliver all detections achieving a threshold to the detector output 1222. The trajectory models may be predetermined and read from memory or may be calculated each time based on parameters selected by the controller 1702.

In an alternative embodiment, the scan processing system 1218 performs an adaptive search to refine a trajectory once a likely detection is found. The initial search may be a single trajectory model or may be a family of trajectory models 1602. Once a likely detection is found, a refined trajectory model, or a refined family of trajectory models 1602 in the neighborhood of the detection is then searched for an improved detection.

For example, once a trajectory exceeds the chosen detection threshold, a neighboring trajectory is examined. The neighboring trajectory is typically produced by varying a single trajectory parameter, such as, for example, velocity. Other example parameters that may be varied include, but are not limited to: acceleration, aerodynamic drag, lateral acceleration, thrust, spin, position, altitude, and others. In one embodiment, the varied parameter is half way between that of two prior chosen and examined trajectories. Once the new trajectory is generated, the combination is compared with the currently highest responding trajectory and the higher of the two becomes the new highest responding trajectory. A subsequent trajectory may be generated using a smaller variation in the chosen parameter.

Alternatively, once successive differences are found in the neighborhood of a detection, Newton's method or related algorithms based on differences or derivatives may be used to estimate the parameter value needed to produce the peak response. Such algorithms may converge quickly when the results are within one response lobe for the given radar and object as evaluated along the selected parameter variation. Simulation or field tests may be used to determine the difference limits suitable for these algorithms.

In one embodiment, the detector 1216 is a threshold comparator and the matching criterion is the threshold setting. A higher threshold setting requires the signal to rise higher out of the noise to trigger a detection. An absolute value function may be performed on the signal prior to detection to detect both positive and negative signal matches, if appropriate.

In another embodiment, the detector includes an object signature matching function, where the signature is a typical pattern with a known feature that can be matched with a known algorithm. One such matching process is a correlation match where a sliding correlation process is used to match the received pattern with an expected pattern.

Mathematical Description

For a two dimension scanning system with a stationary environment, the scan may be described mathematically by the following:

$$V_s = S(r, \theta) \qquad \text{Eq. 1}$$

where, $V_s$ is the radar receiver response;

S( ) is a receiver response function due to the environment including clutter, noise and any object in the environment;

r is the range gate scan parameter, typically derived from a time difference between transmit and receive signals; and $\theta$ is the angle scan parameter relating to antenna directivity.

A system with a moving object, such as shown in FIG. 4, may be described by the following:

$$V_s = S(T, r, \theta) \qquad \text{Eq. 2}$$

where,

T is a time parameter relating to the object movement.

Eq. 2 essentially says that the response voltage is a function of time, range, and angle.

More typically, however, the response is sampled and stored in an array for subsequent processing:

$$A_s = [S_{ijk}] = S(T_i, r_j, \theta_k) \qquad \text{Eq. 3}$$

where, $A_s$ is an array containing scan data from multiple scans over time;

$S_{ijk}$ is an element of array $A_s$;

S is the radar receiver response function $T_i$ is a discrete time parameter indexed by i;

$r_j$ is a discrete range parameter indexed by j;

$\theta_k$ is a discrete angle parameter indexed by k.

A trajectory model may be written:

$$P(T) = [r_m(T), \theta_m(T)] \qquad \text{Eq. 4}$$

where,

P is a position vector describing object position comprising components:

$r_m$, a range component as a function of time, T; and $\theta_m$, an angle component as a function of time, T The sum may be written:

$$M(r, \theta) = \sum_k S(T_k, r - r_m(T_k), \theta - \theta_m(T_k)) \qquad \text{Eq. 5}$$

where,

M( ) is the sum as a function of r and $\theta$, k is an index used to sequence through a set of times, $T_k$, relative to object motion.

The sum of Eq. 5 may be used to implement a moving average filter wherein the sum over K, the range of k, is successively performed utilizing the current most recent scan along with K-1 immediately preceding scans.

In alternative embodiment, other filter types may be used for summing. For example, an exponentially decaying sum may be generated by the following recursive operation:

$$M_n(r, \theta) = \alpha M_{n-1} + (1 - \alpha)S_n \qquad \text{Eq. 6}$$
$$= \alpha M_{n-1} + (1 - \alpha)S(T_n, r - r_m(T_n), \theta - \theta_m(T_n))$$

where, $\alpha$ is a parameter determining the decay rate. $\alpha$ is between 0 and 1, typically slightly less than 1, e.g. 0.9.

n specifies a scan number as part of a continuously running sequence, where n relates to the current scan, n-1 relates to the immediately previous scan, etc.

In a further alternative, a finite impulse response (FIR) filter may be utilized to combine scans by the following:

$$M(r, \theta) = \sum_k \beta_k S(T_k, r - r_m(T_k), \theta - \theta_m(T_k)) \qquad \text{Eq. 7}$$

where, $\beta_k$ are the coefficients of the FIR filter, and other parameters are as previously defined.

In general, any desired filter can be utilized by operating on the shifted scans (shifted in accordance with a trajectory model) to combine the shifted scans in the scan dimension (scan sequence) in the manner that such desired filter would typically be used in a sample sequence, i.e. operate on each scan to scan corresponding element.

There are a number of time scales to be considered for generating and processing scan data. These time scales include range time, sample time, and object time. Range time is the round trip speed of light time to transmit a signal and receive a response. Range is measured using range time delay. For a typical UWB radar, range time may span from a few nanoseconds to a few hundred nanoseconds, more for long range radar. Sample time is the time required to accumulate enough signal to create a sample. A typical radar may integrate from a few to thousands of pulses to create a sample. Sample time may typically span from a few to hundreds of microseconds. Object time is the time scale wherein object movement is to be expected. Object time may span from a few to hundreds of milliseconds. Clearly, specific implementations may exceed the ranges suggested here as typical. These suggested ranges are given to point out the different mechanisms. In some systems, sampling time scales and range time scales may be considered instantaneous when operating on scan data observing object time signals. Where the greatest accuracy is required however, sampling time delays may need to be considered in object path models and object position measurements.

Multiple Family Embodiments

Figure 18:
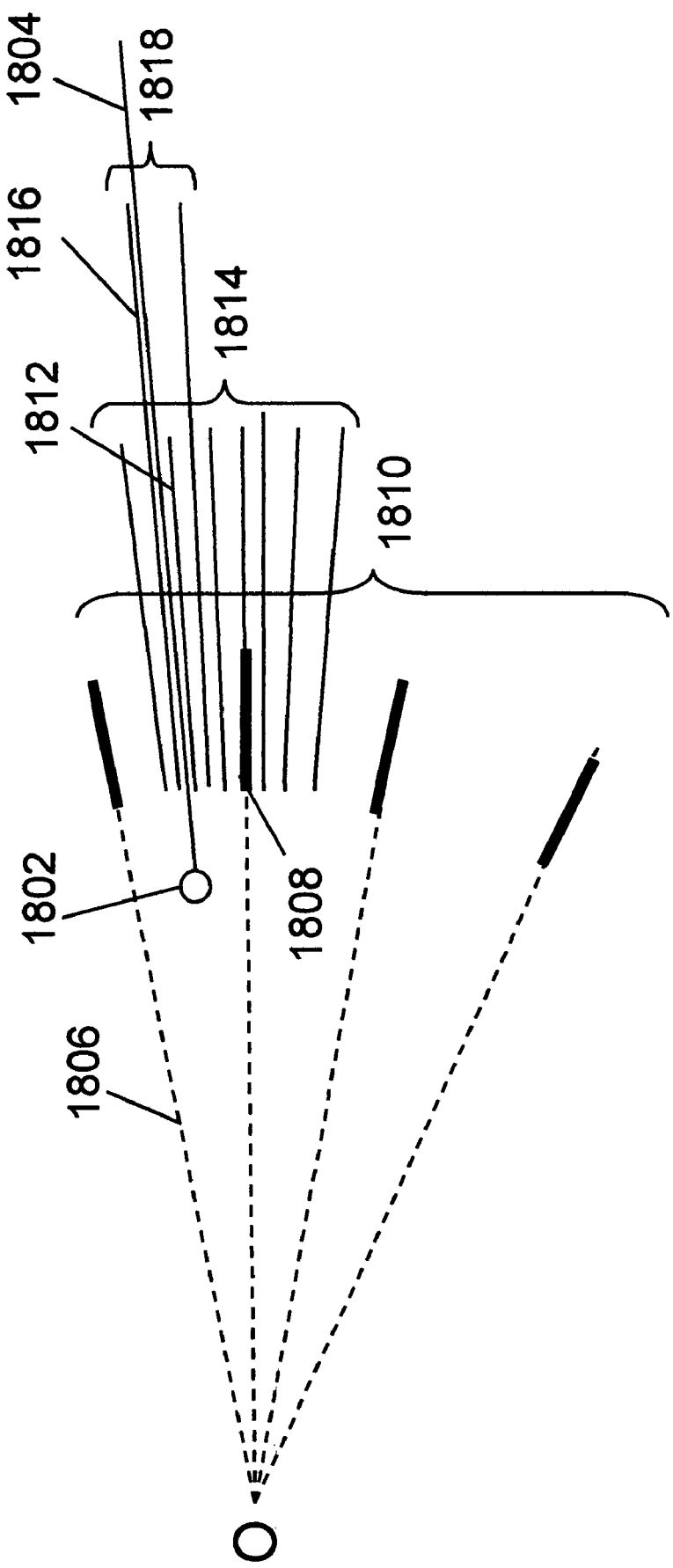
FIG. 18 illustrates the multiple iterations of trajectory resolution refinement in accordance with one embodiment of the invention.

FIG. 18 illustrates the multiple iterations of trajectory resolution refinement in accordance with one embodiment of the invention. Referring to FIG. 18, an object 1802 and its trajectory 1804 are shown along with multiple sets of candidate trajectories 1810, 1814, 1818 used in subsequent refined scan combinations. The dotted lines 1806 represent coarse candidate trajectories 1806 converging to point O. Solid line segments 1808, 1812, 1816 represent a portion of each candidate trajectory wherein the associated scans are integrated to detect a object. As shown in FIG. 18, a potential object is detected in the integration of trajectory portion 1808 in the trajectory family 1810. When a potential object is detected in trajectory 1808, a family of finer resolution trajectory segments 1814 is then examined (integrated) for an object signal. The integration of scans in accordance with trajectory 1812 produces a object detection that initiates a further set of finer resolution trajectories 1818. Integration of scans in accordance with trajectory 1816 produces the greatest response and signals a detection.

Note that the integration segments in set 1814 are spaced closer together than in set 1810. Note also that the segments in set 1814 may be longer in length than those in set 1810 because the finer resolution and greater density of trajectory segments guarantees a smaller maximum error in the matching with an actual trajectory. The segment of group 1814 producing the maximum response is then used as the basis for a set of trajectory segments of further refined resolution. The iterative process of finer and finer resolution may be continued to an appropriate end point based on, for example, the required accuracy.

The process shown in FIG. 18 may be illustrated by an example wherein the first search is performed using a family of trajectories covering a range of expected object trajectories. Each member of the family of trajectories is utilized to combine the scan information and the result is tested for likelihood of an object signal using the detector 1416. When a likely object signal is detected, a refined family of trajectories is generated covering a narrow range around the trajectory indicating the likely object detection, and the refined family of trajectories is used to combine scans and further test for a likely object detection. This process may be repeated until a trajectory match is found with the desired accuracy or until a false detection is determined. For example, in a system designed to find an object moving with an approaching velocity of 20 m/s, the first combination may examine a set of velocities comprising: 15, 16, 17, 18, 19, 20, 21, 22, 23, 24, and 25 m/s velocities. If the combination using 21 m/s indicates a likely object detection, the next set of velocities to be tested could be: 20.2, 20.4, 20.6, 20.8, 21.0 21.2, 21.4, 21.6, and 21.8. The process can be continued. For example, if the combination for 20.6 m/s provided the best match, then the next set of velocities to be tested could be: 20.44, 20.48, 20.52, 20.56, 20.60, 20.64, 20.68, 20.72, and 20.76. As the velocity model becomes finer in resolution, the matching criteria may be increased (i.e., requiring a closer match) because the signal to noise ratio should increase. The higher matching criteria will tend to increase the confidence in detection and reject more false detections.

Families of trajectories may be formed by varying any trajectory parameter, or by varying several together. Multi-dimensional families of trajectories may be formed by varying multiple trajectory parameters separately and independently. Exmples of trajectory parameters that may be varied include, but are not limited to: velocity, acceleration, direction, initial direction, initial velocity, thrust, aerodynamic drag, aerodynamic lift, and other parameters that may be used to define a trajectory.

Figure 19:
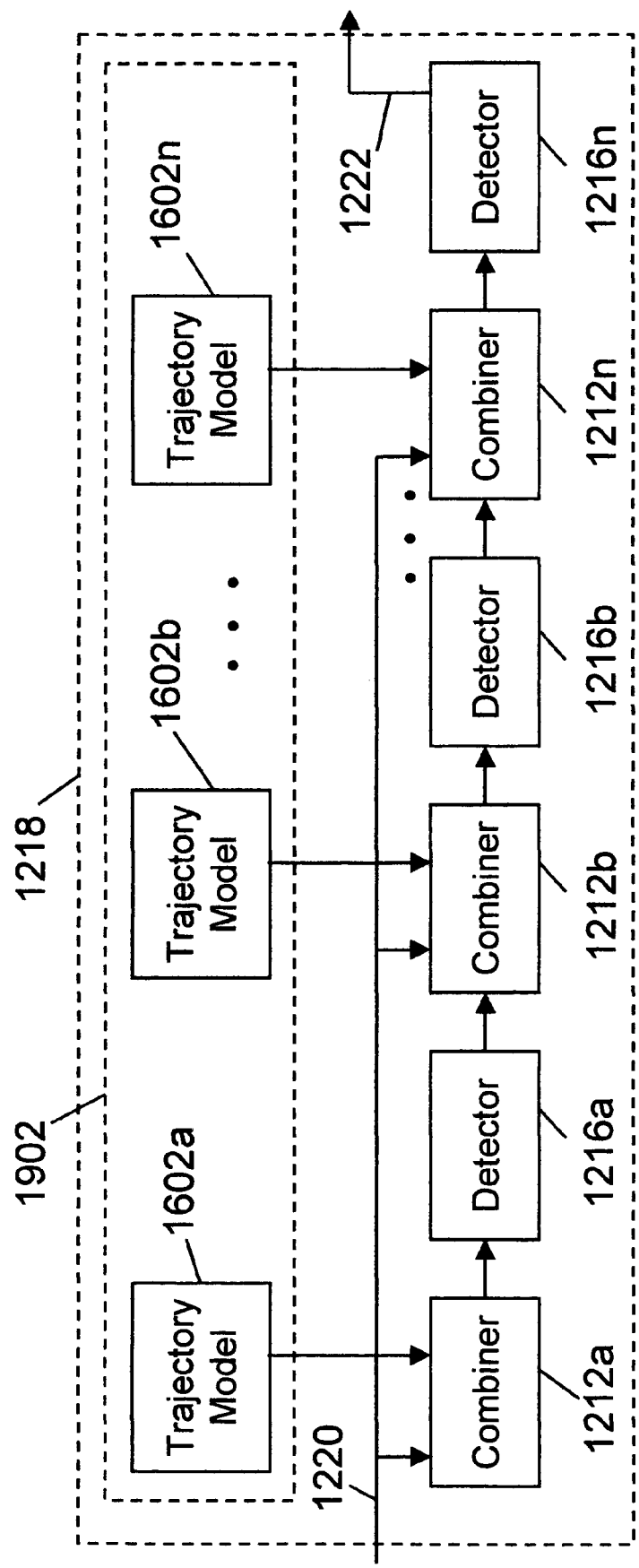
FIG. 19 illustrates a serial scan processing system for evaluation of multiple families of trajectory models.

FIG. 19 illustrates a serial scan processing system 1218 for evaluation of multiple families of trajectory models. FIG. 19 is an exemplary functional block diagram of a scan processing system 1218 employing multiple combiners 1212a through 1212n in accordance with the present invention. Referring to FIG. 19, the scan data set 1220 is fed to multiple combiners 1212a–1212n. Each combiner 1212a–1212n receives a respective family of trajectory models. In operation, combiner 1212a is sequenced through the set of trajectory models 1602a generating a set of combination outputs fed to detector 1216a. If the detector 1216a finds a likely object signal, the detection and associated trajectory model is passed to combiner 1212b. Combiner 1212b combines the scan data set 1220 with trajectory model family 1602b, which is a family of trajectory models of finer resolution in the neighborhood of the trajectory model from family 1602a that produced the first detection. If detector 1216b finds a likely object signal, the detection and trajectory information is passed to the next stage. The process may continue through combiner 1212n for as many stages as necessary to reach the needed resolution and level of confidence in the detection.

Figure 20:
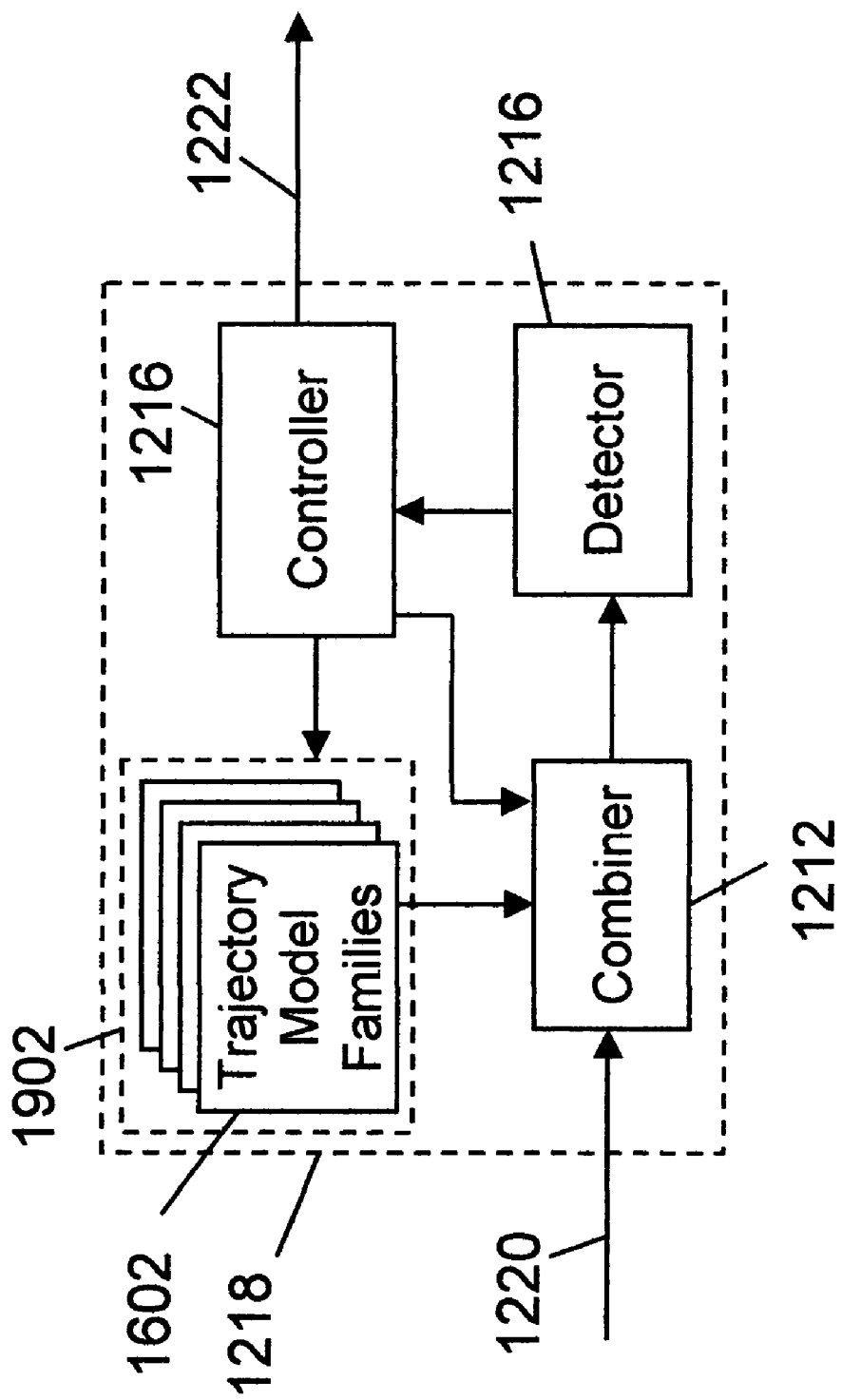
FIG. 20 illustrates an iterative scan processing system utilizing multiple families of trajectory models.

FIG. 20 illustrates an iterative scan processing system 1218 utilizing multiple families of trajectory models. Referring to FIG. 20, the controller 1702 sequences through each trajectory model of each family 1602 in the set of multiple families 1902 of trajectory models until a suitable end criterion is met. In operation, the controller 1702 selects a trajectory model from the first family and initiates the combination. The combiner 1212 combines the scan data in accordance with the first trajectory model and provides the output to the detector 1216. The output of the detector 1216 is fed to the controller 1702 where further action is directed according to the detection result. As in the system of FIG. 17, further trajectory models may be selected from a family or may be derived adaptively. Once a detection is found, the members of a second family of trajectory models are used to combine scans, in turn, searching for the member yielding the greatest likelihood of an object signal, or searching for all members exceeding a given threshold of likelihood. If none is found, the process may terminate. The process continues until a suitable end point is reached. Such endpoint may include, for example, exhaustion of a given number of families, achievement of a predetermined maximum trajectory error, or achievement of a given likelihood of detection or likelihood of no false alarm.

Figure 21A:
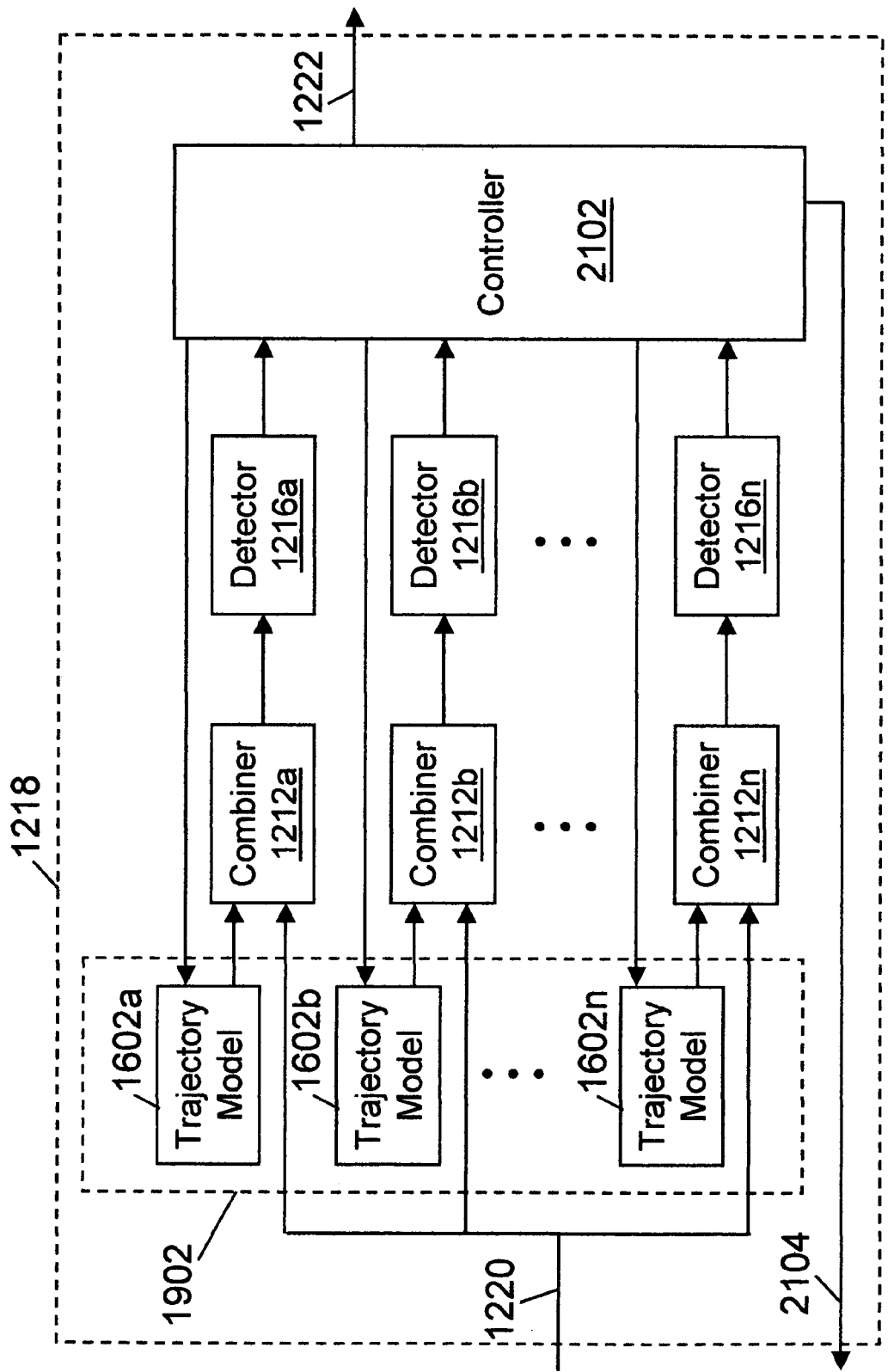
FIG. 21A illustrates an alternative scan processing system for parallel evaluation of multiple trajectory models.

FIG. 21A illustrates an alternative scan processing system for parallel evaluation of multiple trajectory models. The scan processing system of FIG. 21A includes a controller 2102 for selecting trajectory models 1602a–1602n based on combiner 2112a–2112n results. Referring to FIG. 21A, the scan data is fed to the parallel combiners 1212a–1212n. Each combiner 2112a–2112n also receives a respective trajectory model 1602a–1602n. The outputs of the combiners 2112a–2112n are then processed by a detector 2116a–2116n and the detector 2116a–2116n output is fed to the controller 2102.

The scan processing system of FIG. 21A is adapted to process multiple regions of the radar field. The multiple regions may be used to search for multiple objects or may be used to process refined trajectory models 1602a–1602n based on multiple initial object detections. The parallel combiners 2112a–2112n may be allocated independently or may be associated with particular related work for convenience or for implementation efficiency. For example, to perform an initial search using five families, each comprising 100 trajectory models 1602a–1602n, five parallel combiners 2112a–2112n may operate on five consecutive trajectory models 1602a–1602n in the first family for 20 iterations and then move to the second family for the next 20 iterations and so on until all families are processed. Alternatively, the five parallel combiners 2112a–2112n may be each associated with respective families 1602a–1602n such that each parallel combiner 2112a–2112n operates on sequential trajectory models 1602a–1602n for its assigned family for 100 iterations.

Once an initial search is performed, the parallel combiners 2112a–2112n may be used to process refined trajectory models 1602a–1602n in the neighborhood of potential object signal detections. For example, in the case of the five families of 100 trajectory models 1602a–1602n, the initial search may yield 17 potential object detections. A subsequent search may utilize any of the various strategies discussed herein such as adaptive search or refined families, or a mix of strategies. The five parallel combiners 2112a–2112n may be allocated among the needs of the various strategies in play in a fixed or flexible manner depending on implementation details. In one exemplary embodiment, two of the five parallel combiners 2112a–2112n may be allocated to adaptive search algorithms with the remaining three allocated to refined family search algorithms. In another exemplary embodiment, a FIFO (first in first out) queue is formed comprising requested trajectory models generated from adaptive search and/or refined family algorithms and the five parallel combiners 2112a–2112n operate using the FIFO trajectory models 1602a–1602n taken in sequence.

In an alternative embodiment, the scan processing system of FIG. 21A may deliver control commands 2104 to the scanner 1210 (FIG. 12) based on potential detected object results. If a potential object is detected, further scanning may be concentrated in the region of the detection to provide more finely resolved data to support more finely resolved trajectory models 1602a–1602n. Further, the trajectory information associated with a detection may allow approximate tracking by the radar allowing longer integration during the original data acquisition of a scan.

Figure 21B:
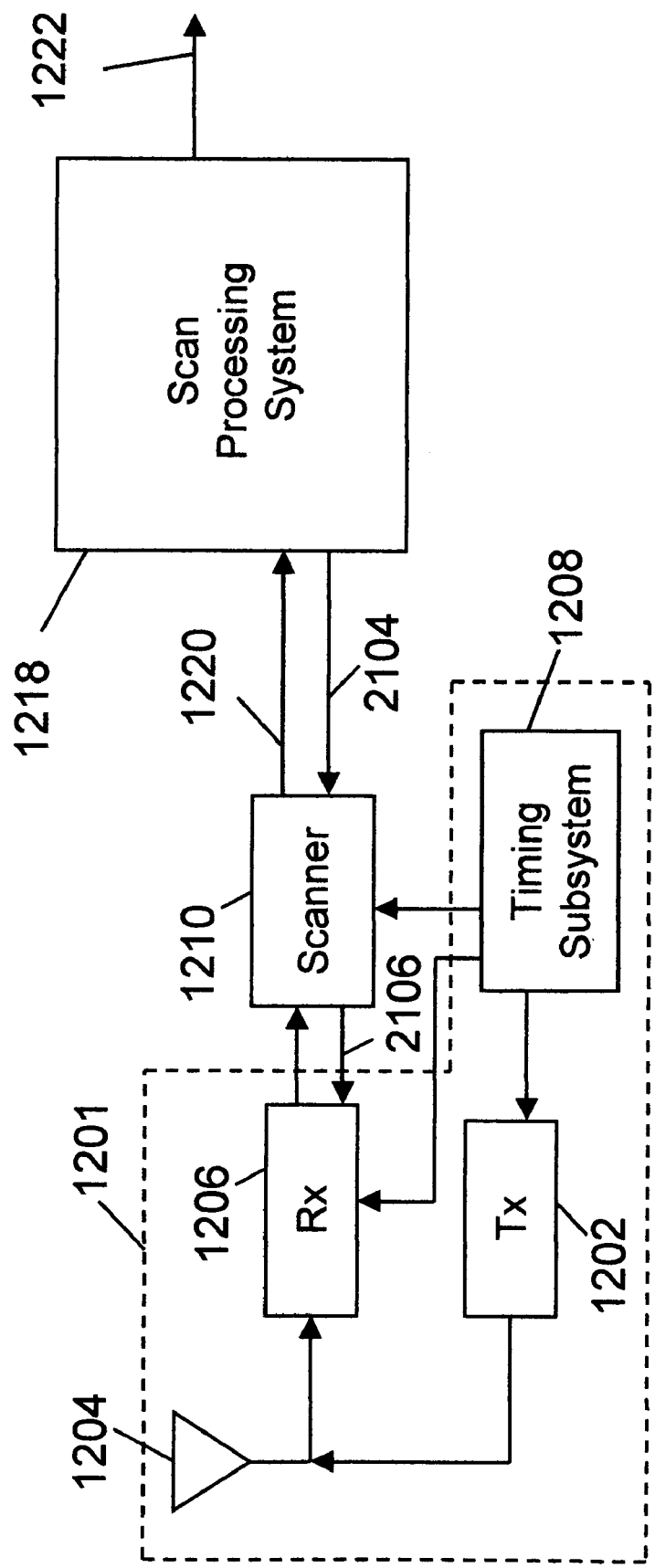
FIG. 21B is an exemplary block diagram of a basic system including scanner control by the scan processing system.

FIG. 21B is an exemplary block diagram of a basic system including scanner control by the scan processing system. Referring to FIG. 21B, the scan processing system may send control commands 2104 to the scanner. The scanner may in turn control the radar subsystem 1201 to produce refined scans in the neighborhood of a potential object detection, thus making best use of available radar and data acquisition resources. The radar control may be accomplished before there is enough signal to begin tracking the object.

Figure 22:
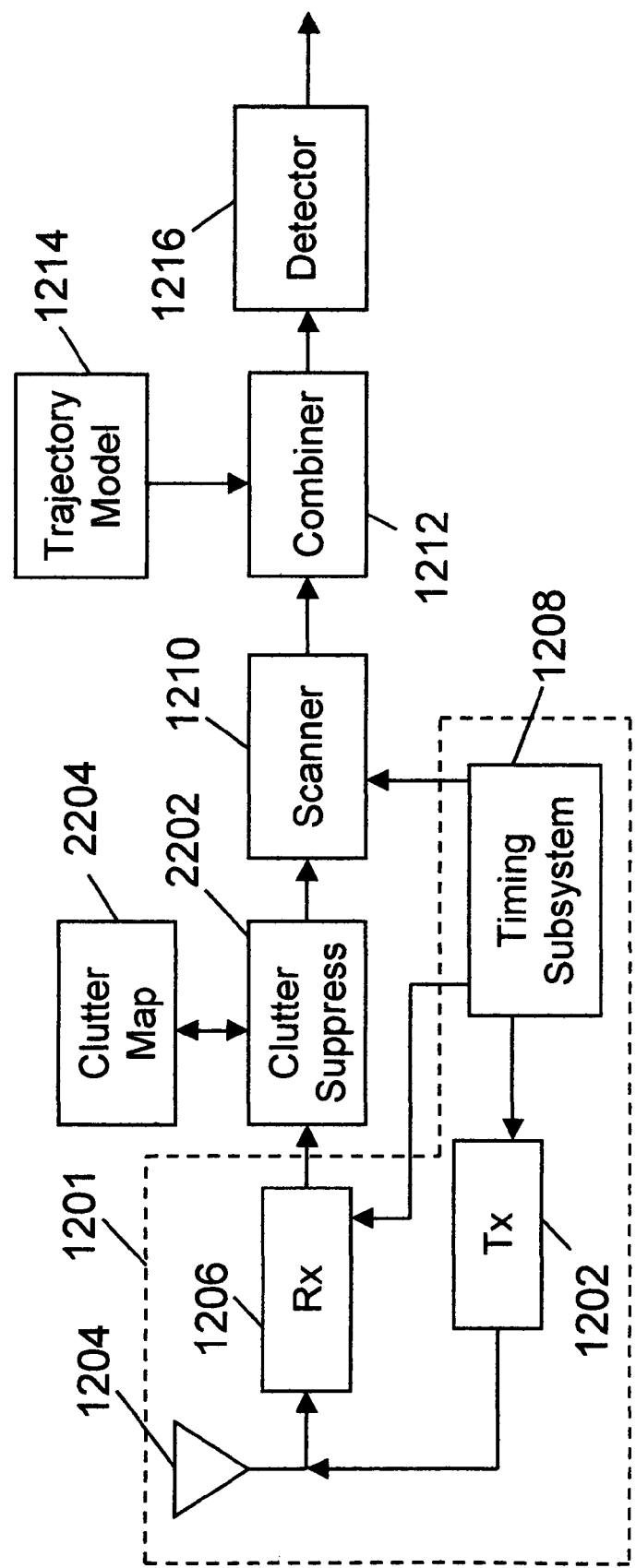
FIG. 22 illustrates a system including clutter suppression.

FIG. 22 illustrates a system including clutter suppression. Clutter is typically the response from the environment. For a stationary radar in a quiet environment (without motion), the clutter signal is predominantly a constant pattern and may be removed by subtraction. Referring to FIG. 22, clutter is suppressed before the scan data is provided to the combiner. In FIG. 22, a clutter suppressor 2202 generates a clutter map 2204 by summing a number of successive scans. The clutter suppressor 2202 then subtracts the clutter map 2204 from each scan delivered to the scanner 1210.

In the case where the clutter contains motion such as rain or wind blown trees, or when the radar is mobile, the clutter map 2204 subtraction method is not as effective; however, clutter may still be suppressed by combining scans in accordance with a candidate trajectory. Thus, the two methods may be used together as shown in FIG. 22. The stationary portion of clutter is subtracted in the clutter suppressor 2202 and the moving portion of clutter is suppressed by combining scans in accordance with a trajectory model.

Figure 23:
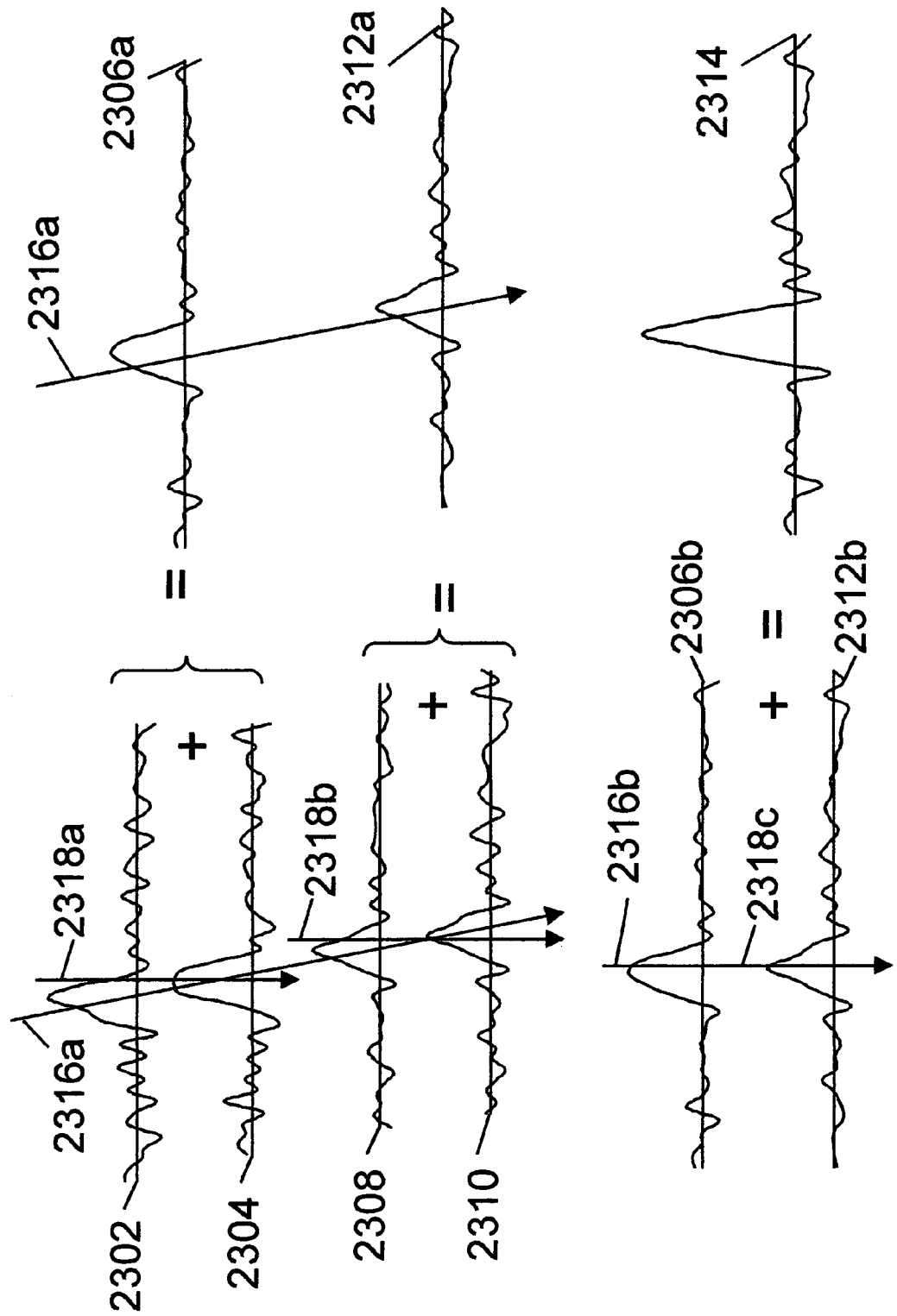
FIG. 23 illustrates a grouping of scans to produce partial sums to reduce the number of calculations necessary to generate a combination.

FIG. 23 illustrates a grouping of scans to produce partial sums to reduce the number of calculations necessary to generate a combination. The grouping process is based on the observation that for a set of trajectory models that are finely resolved, adjacent trajectories in a given summation may be only slightly shifted in time according to a given trajectory model before being used in the summing process. Where the shift is small, for example, less than ¼ wavelength at the center frequency, the adjacent scans may be combined in a partial summation. The partial summation may be used in the summations of multiple trajectory models without shifting the individual scans in the partial summation. The partial summation process may thus reduce the number of calculations needed to evaluate a given range of trajectory models. The process may be extended to include larger groups of partial summations, i.e. more than two. Partial summations may be nested, i.e. several partial summations may be summed to generate a set of composite partial summations that are shifted to generate the sum that is used for detection.

Referring to FIG. 23, graphs 2302, 2304, 2308, 2310 represent four range scans taken at successive times. The range scans include an object response moving along trajectory 2316a. In accordance with the present invention, range scans 2302 and 2304 are summed along direction 2318a to produce partial sum 2306a. Likewise, range scans 2308 and 2310 are summed along direction 2318b to produce partial sum 2312a. Since the scans 2302 and 2304 are from adjacent times, the movement is slight and the object response in sum 2304 is substantially the same as if summed along direction 2316a, and similarly for scans 2308, 2310 resulting in partial sum 2312a. Next, the sums 2306a and 2312a are aligned along trajectory 2316a, resulting in 2306b and 2312b. Trajectory 2316a becomes 2316b as a result of the alignmenet. The 2306b and 2312b partial sums are summed along direction 2318c (which is parallel to 2316b) to produce the sum 2314, which is then delivered to the object detector. In practice, the shifting and summing of partial sum 2306a and partial sum 2312a could be performed for a family of shift amounts without recalculating the sum of 2302 and 2304 to produce a new partial sum 2306a and likewise for 2308, 2310, and 2312a. The ability to produce multiple sums based on multiple shift amounts using one set of partial sums can potentially save considerable time and computation resources.

The principles of the invention may be extended to multiple dimensions using the teachings herein. Partial sums of one or more dimensions may be developed and then used to generate families of sums based on a set of trajectory models.

FIG. 23 illustrates the principle for the case of a constant velocity linear trajectory model for simplicity of discussion. For more complex trajectories, the principle is the same in that points are summed from successive scans along the path of a candidate trajectory.

Whereas the candidate trajectories of FIG. 23 are along the range dimension, candidate trajectories may be formed by varying any or several of the trajectory definition parameters. Also note that the combination for the partial combination may employ integration, filtering, summing or other methods as described herein for the combination.

Trajectory Models

Trajectory models represent the expected trajectory or range of trajectories for the expected object. Trajectory models may include a single variable or may describe a multidimensional function. For example, in the case of a baseball being thrown in the direction of a radar antenna, the trajectory model may be based on velocity alone (neglecting the slight vertical drop). Thus, the scans may be evaluated for a set of velocities from 15 to 25 m/s, depending on the baseball league. However when tracking a basketball, the trajectory model would likely include a forward velocity component and a vertical velocity component that is affected by gravity. Thus there is a two dimensional array of trajectory models that may be examined for any region in space. In the case of the basketball, a forward and vertical velocity limit may be defined to limit the set of trajectories that would be tested. A further constraint may be developed by noting that for any point in space, only a limited set of vertical and horizontal velocities will result in a "basket." Thus, although there are two dimensions, the range of the second dimension can be greatly reduced. For example, the first dimension may be forward velocity. For each distance and altitude from the basket one can solve for a corresponding vertical velocity that will make the basket. Only a narrow range around this corresponding vertical velocity need be tested.

Combining Scans

One objective of combining scans is to gain signal to noise advantage by combining object signal responses coherently while combining noise or clutter signals incoherently. In one embodiment, a radar baseband signal comprising polarity and voltage amplitude is used to generate the scans. Alternatively, an absolute value voltage signal or power signal (voltage squared), or log power signal may be used to generate scans. For small objects or objects with a clear signature, the voltage amplitude with polarity may be preferred. For large objects with an uncertain signature, absolute value or power signals may allow detection of the general form. Absolute value or power signals will have a DC value that will need to be rejected in the detection.

Scans may be combined by summing the points from sequential scans along the direction of a candidate trajectory. The summing may be performed by filtering techniques such as a moving average filter, a Bessel filter, a Butterworth filter, an elliptical filter, or other known filter techniques.

In one embodiment a scan is processed in the scanner to include both the signal information and an estimated signal to noise value. The signal to noise value may be based on range or clutter estimates. Where radar range varies over the length of the scan, signal to noise may vary widely. Signal to noise varies typically by $1/R^4$, where R is the range from the radar to the object. Signal to clutter may vary by some other power of R depending on the application and environment, or may be estimated by a clutter removal or estimation algorithm. In systems where signal to noise is estimated, a family of filter algorithms such as Kalman, least squares, maximum likelihood, and others may utilize the signal to noise information to advantage. In one embodiment, the power (voltage squared) signal to noise value is the input to the summing filter.

Matching The Path Error With Length Of Filter

For best performance, care should be taken to match the filter length (for instance, the number of points contained in the sum of a moving average filter) with the potential candidate trajectory error. The trajectory error may arise from at least two sources. One, a mismatch in one of the trajectory parameters, for example velocity. Two, the object may be part way along the trajectory. In either case, if a scan is added where there is no object signal, only noise will be added, reducing the signal to noise of the result. Thus, for a family of coarse trajectories, the length of the filter is typically shorter than for a family of finer resolution trajectories because of the likelihood of trajectory mismatch. To handle the case of an object entering the radar field, shortened filters may be used at long ranges. Thus for each candidate trajectory, scans may be combined using multiple filter lengths, each combination being tested for object detection. Field tests or simulation may be used to determine a minimum detectable signal at maximum range for a given expected object. The filter length may then be adjusted to optimize for the minimum detectable signal at long range.

Ultra Wideband Advantages

Although the invention may be used with narrow band radar, ultra wideband radar offers advantages that enable some features of the present invention. One in particular relates to coherent detection. In coherent detection, a matched template is used in a correlation process to produce a baseband signal. Typically multiple samples from the same point in space are summed to generate each point on a scan. UWB enables the use of scans generated using coherent detection because of a favorable object size to bandwidth relationship. Because of the ultra wide bandwidth of the signal, object response signals may be very short, comprising very few RF cycles. Because of the fine range resolution, UWB radar can be adapted to applications involving short ranges and small objects where narrow band radar is useless because the narrow bandwidth precludes resolution of the objects. These short range applications, unique to UWB, present configurations especially tolerant to trajectory mismatch, where it is practical to combine scans generated using coherent processing.

For example, a 3 GHz narrow band radar with a 1 µs pulse yields an object response signal with 3000 cycles of RF energy for small objects. Coherent processing requires the object trajectory to be predicted within a fraction of a cycle, typically ¼ cycle, over the length of the trajectory. For a trajectory length equivalent to three pulse lengths, the trajectory is 9000 cycles for an error of 0.0028 percent—a difficult task at best. In the case of a narrow band radar, non-coherent signal detection such as absolute value or RMS (root-mean-square) value (power) detection may be used to generate a scan that follows the pulse envelope and is not sensitive to RF cycle timing or phase. Non-coherent scans may then be combined in accordance with a trajectory. Non-coherent scans, however, do not have the signal to noise advantage of coherent scans.

By contrast, a typical 3 GHz UWB case may involve an object moving 10 meters per second at a range of 20 meters. The object return signal may be only three RF cycles. Detecting the object coherently over a trajectory length equivalent to three pulse lengths suggests a trajectory accuracy requirement of ¼ cycle in 9 cycles or 2.8%—significantly easier to achieve than in the narrow band radar case.

Computer Embodiments

It is envisioned that embodiments of the present invention would employ one or more computers to perform the steps of the invention. The computers may also include memory to store the programmed instructions that control the computer to perform the steps of the present invention. Several computer architectures may be used for the present invention including the Von Neumann architecture, state machine architectures, signal processor architectures, and others. Because of the many similar and independent sums that must be generated, multithreaded and parallel processing architectures may be used to advantage. Scan data may be stored in any of the memory devices available to the computer including random access memory, flash memory, disk memory, floppy disk, CD, DVD, memory stick or other memory device. Where scan data, scan data sets, scans, or scan files are discussed in this disclosure, all data formats are included.

The benefits of the present invention may be realized for many applications where a radar system is directed toward a moving object. In the sports field, for example, there is growing interest in tracking the players and associated equipment, such as footballs, baseballs, tennis balls, etc. for enhanced display in network game coverage or for computer analysis in training or post game analysis. In the military, there is interest in tracking soldiers both in training exercises and in real battle, as well as detecting and tracking incoming projectiles, both short range and long range. The invention may also prove beneficial to security sensors based on radar technology to improve the sensitivity and discrimination accuracy with respect to intruders, i.e. to distinguish between a cat and a burglar. In the manufacturing industry, the invention may be used to detect objects in a safety zone in order to stop dangerous equipment, or to detect and measure objects on a conveyor belt to count the objects or to assure a desired quality. Certainly, numerous other applications may utilize the benefits of the present invention.

CONCLUSION

While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements which embody the spirit and scope of the present invention.

What is claimed is:

1. A radar system for detecting an object, said object having a trajectory, said system comprising:

a radar subsystem including a transmitter, receiver, antenna, and associated timing system, said radar subsystem producing a response signal;

a scanning system coupled to said radar subsystem for scanning said radar subsystem and recording a plurality of scans; each of said scans comprising a plurality of said response signals;

a trajectory model source for providing a trajectory model;

a combiner coupled to said scanning system and said trajectory model source;

said combiner producing a combination output resulting from the combination of said plurality of scans in accordance with said trajectory model;

a detector coupled to said combiner, said detector receiving said combination output, said detector for detecting probable object response signals.

2. The system as in claim 1 wherein said antenna is scanned in at least one angle dimension and said scanning system records said plurality of scans based on varying said angle dimension.

3. The system as in claim 2 wherein said antenna is mechanically scanned.

4. The system as in claim 2 wherein said antenna is electrically scanned.

5. The system as in claim 1 wherein said combiner includes an integrator.

6. The system as in claim 1 wherein said combiner includes a filter.

7. The system as in claim 6 wherein said filter is an exponentially decaying summation.

8. The system as in claim 6 wherein the filter is a Finite Impulse Response filter.

9. The system as in claim 6 wherein the combiner includes one of a moving average filter, Butterworth filter, a Bessel filter, and an elliptical filter.

10. The system as in claim 1 wherein said combiner combines scans by summing scans wherein said scans are shifted in accordance with said trajectory model.

11. The system as in claim 10 wherein said trajectory model includes a range dimension and said scans are shifted in said range dimension.

12. The system as in claim 10 wherein said trajectory model includes an angle dimension and said scans are shifted in said angle dimension.

13. The system as in claim 1 wherein the radar receiver coherently detects received signals.

14. The system as in claim 1 wherein the radar receiver detects received signal envelope power.

15. The system as in claim 1 wherein the radar receiver provides received signal-to-noise ratio information to the scanner and scan data is combined using received signal-to-noise ratio information.

16. The system as in claim 15 wherein the scan data represents received signal to noise power ratio information.

17. The system as in claim 1 further including a clutter suppressor wherein clutter is suppressed before scans are combined.

18. The system as in claim 17 wherein the clutter suppressor generates a clutter map by summing a number of successive scans and subtracts the clutter map from at least one scan delivered to the scanning system.

19. The system as in claim 1 further including a second combiner and a second detector; said second combiner coupled to said scanner, said trajectory model source, said first detector, and said second detector; said trajectory model source providing a refined trajectory model to said second combiner; wherein said second combiner combines said scan information in accordance with said refined trajectory model after said first detector detects a probable object signal; said second detector for improved detecting of a probable object signal.

20. The system as in claim 1 further including a controller coupled to said combiner, said trajectory model source, and said detector wherein said system iteratively combines said scans in accordance with more finely resolved trajectory models.

21. A radar system for detecting an object, said object having a trajectory, said system comprising:

a radar subsystem including a transmitter, receiver, antenna, and associated timing system, said radar producing a response signal;

a scanning system coupled to said radar for scanning said radar and recording a plurality of scans; each of said scans comprising a plurality of said response signals;

a trajectory model source for providing a coarse trajectory model;

a first combiner coupled to said scanning system and to said trajectory model source; said first combiner receiving said coarse trajectory model from said trajectory model source;

said first combiner producing a first combination output resulting from the combination of said plurality of scans in accordance with said coarse trajectory model;

a first detector coupled to said first combiner, said first detector receiving said first combination output, said first detector for detecting probable object signals;

a second combiner coupled to said scanning system, said trajectory model source, and said first detector; said trajectory model source providing a fine trajectory model to said second combiner;

said second combiner producing a second combination output resulting from the combination of said plurality of scans in accordance with said fine trajectory model;

a second detector coupled to said second combiner, said second detector receiving said second combination output, said second detector for refined detecting of probable object signals.

22. A radar system for detecting an object, said object having a trajectory, said system comprising:

a radar subsystem including a transmitter, receiver, antenna, and associated timing system, said radar subsystem producing a response signal;

a scanning system coupled to said radar subsystem for scanning said radar subsystem and recording a plurality of scans; each of said scans comprising a plurality of said response signals;

a trajectory model source for providing a plurality of trajectory models;

a plurality of combiners coupled to said scanning system and said trajectory model source, each combiner receiving a respective trajectory model;

said combiners each producing a combination output resulting from the combination of said plurality of scans in accordance with said respective trajectory model;

a detector coupled to said plurality of combiners, said detector receiving said combination outputs, said detector for detecting probable object response signals.

23. The system as in claim 22 wherein the detector delivers an output in accordance with said combiner output having the greatest probability of including said object response signal.

24. The system as in claim 22 wherein the detector delivers an output including information on all of the combiner outputs meeting a criterion for likelihood of including said object response signal.

25. A radar system for detecting an object, said object having a trajectory, said system comprising:

a radar subsystem including a transmitter, receiver, antenna, and associated timing system, said radar subsystem producing a response signal;

a scanning system coupled to said radar subsystem for scanning said radar subsystem and recording a plurality of scans; each of said scans comprising a plurality of said response signals;

a scan processing system further comprising:
at least one trajectory model source for providing at least one trajectory model,
at least one combiner coupled to said scanning system and said trajectory model source,
said at least one combiner producing a respective combination output resulting from the combination of said plurality of scans in accordance with said at least one trajectory model;
at least one detector coupled to said at least one combiner, said at least one detector receiving said respective combination output, said detector producing a detection result indicative of the likelihood of an object response signal.

26. The system as in claim 25 wherein said scan processing system controls the scanning of said radar subsystem in accordance with said detection result.

27. Method for detecting a moving object in the field of a radar, said method comprising the steps of:
producing a candidate trajectory;
producing a plurality of scan data sets;
combining said plurality of scan data sets in accordance with said candidate trajectory to produce a combination data set;
detecting potential moving object signals using said combination data set.

28. The method of claim 27 wherein the field includes a range dimension, wherein the scanning includes scanning in the range dimension.

29. The method of claim 27 wherein the field includes an azimuth dimension, wherein the scanning includes scanning in the azimuth dimension.

30. The method of claim 27 wherein the radar is an ultra wideband radar.

31. The method of claim 30 wherein the radar is an impulse radar.

32. The method of claim 27 wherein the combining step includes summing scan data sets in accordance with said candidate trajectory.

33. The method of claim 27 wherein the combining step includes filtering scan data sets in accordance with said candidate trajectory.

34. The method of claim 33 wherein the filter includes at least one of a moving average filter, a Butterworth filter, a Bessel filter, and an elliptical filter.

35. The method as in claim 27 wherein said candidate trajectory is one of a family of candidate trajectories.

36. The method as in claim 35 wherein the family of candidate trajectories is limited in at least one dimension.

37. The method as in claim 36 wherein at least one limit is based on expected object velocity.

38. The method as in claim 36 wherein at least one limit is based on at least one of object distance, object direction, object size, object source, and object destination.

39. The method as in claim 35 wherein the family of trajectories is generated by varying at least one trajectory parameter.

40. The method as in claim 39 wherein the parameter is object velocity.

41. The method as in claim 39 wherein the parameter is object source position.

42. The method as in claim 39 wherein the parameter is object acceleration.

43. The method as in claim 39 wherein the parameter is object position.

44. The method as in claim 27 further including the step of subtracting the background.

45. The method as in claim 27 further including the step of clutter suppression.

46. The method as in claim 27 further including the step of setting the detection threshold for a constant false alarm rate.

47. The method as in claim 27 wherein the scan data sets are developed sequentially.

48. The method as in claim 27 wherein the scan data sets are developed using a pseudorandom sequencing process.

49. The method as in claim 27 wherein the scan data is stored in an array.

50. The method as in claim 49 wherein the scan data is shifted an integral number of positions in the array before being combined.

51. The method as in claim 49 wherein the scan data is shifted a fractional number of positions relative to the array indexing using interpolation to produce an interpolated scan data set and the interpolated scan data set is combined to produce said combination data set.

52. The method as in claim 51 wherein the method of interpolation is linear interpolation.

53. Method for detecting a moving object in the field of a radar, said method comprising the steps of:
configuring said radar for scanning;
scanning said radar over at least a portion of said field to produce a plurality of scan files;
providing a coarse candidate trajectory;
combining the plurality of scan files in accordance with said coarse candidate trajectory to produce a first combination signal;
detecting potential moving object signals using said first combination signal.
providing a fine candidate trajectory;
combining the plurality of scan files in accordance with said fine candidate trajectory to produce a second combination signal;
detecting potential moving object signals using said second combination signal.

54. Method for detecting a moving object in the field of a radar, said method comprising the steps of:
1) configuring said radar for scanning;
2) scanning said radar over at least a portion of said field to produce a plurality of scan files;
3) providing a first candidate trajectory;
4) combining the plurality of scan files in accordance with said first candidate trajectory to produce a first combination signal;
5) detecting potential moving object signals using said combination signal;
6) and iteratively:
6a) providing a refined candidate trajectory;
6b) combining the plurality of scan files in accordance with said refined candidate trajectory to produce a refined combination signal; and
6c) detecting potential moving object signals using said refined combination signal.

55. The method as in claim 54 wherein the refined candidate trajectory is a member of a refined family of trajectories.

56. The method as in claim 54 wherein the refined candidate trajectory is derived by varying a trajectory parameter.

57. The method as in claim 56 wherein the trajectory parameter is velocity.

58. The method as in claim 56 wherein the trajectory parameter is acceleration.

59. The method as in claim 56 wherein the trajectory parameter is varied based on successive differences.

60. The method as in claim 59 wherein the method of successive differences is Newton's method.

61. Method for detecting a moving object in the field of a radar, said method comprising the steps of:
- producing a plurality of scan data sets;
- providing a candidate trajectory;
- combining the plurality of scan data sets in accordance with said candidate trajectory to produce a set of partial combination data sets;
- combining the set of partial combination data sets in accordance with said candidate trajectory to produce a combination data set;
- detecting potential moving object signals using said combination data set.

62. Method for detecting a moving object in the field of a radar, said method comprising the steps of:
1) producing a plurality of scan data sets;
2) providing a candidate trajectory;
3) combining the plurality of scan data sets in accordance with said candidate trajectory to produce a set of partial combination data sets;
4) iteratively,
4a) providing a refined candidate trajectory;
4b) combining the set of partial combination data sets in accordance with said refined candidate trajectory to produce a combination data set;
4c) detecting potential moving object signals using said combination data set.

* * * * *